US012330895B2

(12) United States Patent
Takemura

(10) Patent No.: US 12,330,895 B2
(45) Date of Patent: Jun. 17, 2025

(54) SHEET STORING DEVICE AND SHEET PROCESSING DEVICE

(71) Applicant: GLORY LTD., Himeji (JP)

(72) Inventor: Yoichi Takemura, Hyogo (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 18/599,262

(22) Filed: Mar. 8, 2024

(65) Prior Publication Data

US 2024/0208759 A1 Jun. 27, 2024

Related U.S. Application Data

(63) Continuation of application No. PCT/JP2022/033768, filed on Sep. 8, 2022.

(30) Foreign Application Priority Data

Sep. 16, 2021 (JP) ................................ 2021-150976
Nov. 1, 2021 (JP) ................................ 2021-178802

(51) Int. Cl.
*B65B 25/14* (2006.01)
*B65B 5/06* (2006.01)
(Continued)

(52) U.S. Cl.
CPC ............ *B65H 29/46* (2013.01); *B65B 5/067* (2013.01); *B65B 7/06* (2013.01); *B65B 25/14* (2013.01);
(Continued)

(58) Field of Classification Search
CPC .......... B65B 25/14; B65B 51/14; B65B 7/02; B65B 5/067; B65B 7/06; B65H 29/46; G07D 11/00; G07D 11/13
See application file for complete search history.

(56) References Cited

U.S. PATENT DOCUMENTS 9,114,952 B2 8/2015 Hülland-Letz
9,466,167 B2 * 10/2016 Razzaboni ......... G07D 11/0096
(Continued)

FOREIGN PATENT DOCUMENTS

EP 3521222 8/2019
EP 3744669 12/2020
(Continued)

OTHER PUBLICATIONS

International Search Report and Written Opinion for International Application No. PCT/JP2022/033768 mailed on Nov. 8, 2022, 9 pages.

(Continued)

*Primary Examiner* — Andrew M Tecco
(74) *Attorney, Agent, or Firm* — Amin, Turocy & Watson, LLP

(57) ABSTRACT

A sheet storing device of the present disclosure includes: an attaching part configured to attach a storage bag for a sheet; a moving part configured to move the sheet toward inside of the storage bag; a first guide part configured to make contact with an inner surface of the storage bag; and a second guide part configured to make contact with an outer surface of the storage bag, and sandwich the storage bag together with the first guide part. The first guide part comprises a first flat surface configured to make contact with the sheet moved by the moving part. The second guide part comprises a second flat surface configured to make contact with the outer surface of the storage bag such that the sheet moved by the moving part makes contact with a part of the inner surface of the storage bag. The first guide part and the second guide part are disposed such that the first flat surface and the second flat surface are located on the same plane.

15 Claims, 19 Drawing Sheets

(51) Int. Cl.

| | |
|---|---|
| ***B65B 7/06*** | (2006.01) |
| ***B65B 43/54*** | (2006.01) |
| ***B65H 29/46*** | (2006.01) |
| ***B65H 31/02*** | (2006.01) |
| ***B65H 31/26*** | (2006.01) |
| ***G07D 11/13*** | (2019.01) |

(52) U.S. Cl.

CPC ............. *B65B 43/54* (2013.01); *B65H 31/02* (2013.01); *B65H 31/26* (2013.01); *G07D 11/13* (2019.01); *B65H 2301/422548* (2013.01); *B65H 2701/1912* (2013.01); *G07D 2211/00* (2013.01)

(56) References Cited

U.S. PATENT DOCUMENTS 10,046,873 B2 * 8/2018 Razzaboni .............. B65B 45/00
10,169,944 B2 * 1/2019 Razzaboni ............ B65B 51/146
10,899,482 B2 * 1/2021 Takemura ............... G07F 11/64
11,059,689 B2 * 7/2021 Takemura .............. G07D 11/18
11,338,949 B2 * 5/2022 Okuda .................... B65B 51/10
2014/0331612 A1 * 11/2014 Jeschke ...................... B65B 5/08 53/540
2016/0098880 A1 * 4/2016 Razzaboni .............. B65B 5/106 53/235
2018/0251244 A1 * 9/2018 Takemura ............ G07D 11/009
2018/0305048 A1 * 10/2018 Nishimura ................ B65B 7/00
2019/0218052 A1 * 7/2019 Takemura .............. B65H 29/46
2019/0233147 A1 * 8/2019 Okuda .................. B65B 51/146
2020/0312077 A1 10/2020 Mutou

FOREIGN PATENT DOCUMENTS

JP 08-282625 10/1996
JP 2018-181137 11/2018
JP 2020-160522 10/2020
JP 2020-194386 12/2020

OTHER PUBLICATIONS

Extended European Search Report for European Patent Application No. 22869897.3 dated Dec. 13, 2024.

* cited by examiner

SHEET STORING DEVICE AND SHEET PROCESSING DEVICE

CROSS REFERENCE TO RELATED APPLICATIONS

This application is a bypass Continuation of International Patent Cooperation Treaty Application No. PCT/JP2022/033768, filed on Sep. 8, 2022, which claims priority to Japanese Patent Application No. 2021-150976, filed on Sep. 16, 2021, and Japanese Patent Application No. 2021-178802, filed on Nov. 1, 2021, the entire disclosures of each are incorporated herein by reference.

BACKGROUND ART

Sheet storing devices for storing sheets such as valuable securities or banknotes are widely used. Among examples of such sheet storing devices is a device that sends banknotes into a laterally disposed bag, and stacks the banknotes in a standing state in the bag.

SUMMARY

A sheet storing device of the present disclosure includes: an attaching part configured to attach a storage bag for a sheet; a moving part configured to move the sheet toward inside of the storage bag; a first guide part configured to make contact with an inner surface of the storage bag; and a second guide part configured to make contact with an outer surface of the storage bag, and sandwich the storage bag together with the first guide part. The first guide part comprises a first flat surface configured to make contact with the sheet moved by the moving part. The second guide part comprises a second flat surface configured to make contact with the outer surface of the storage bag such that the sheet moved by the moving part makes contact with a part of the inner surface of the storage bag. The first guide part and the second guide part are disposed such that the first flat surface and the second flat surface are located on the same plane.

DESCRIPTION OF EMBODIMENTS

Figure 1:
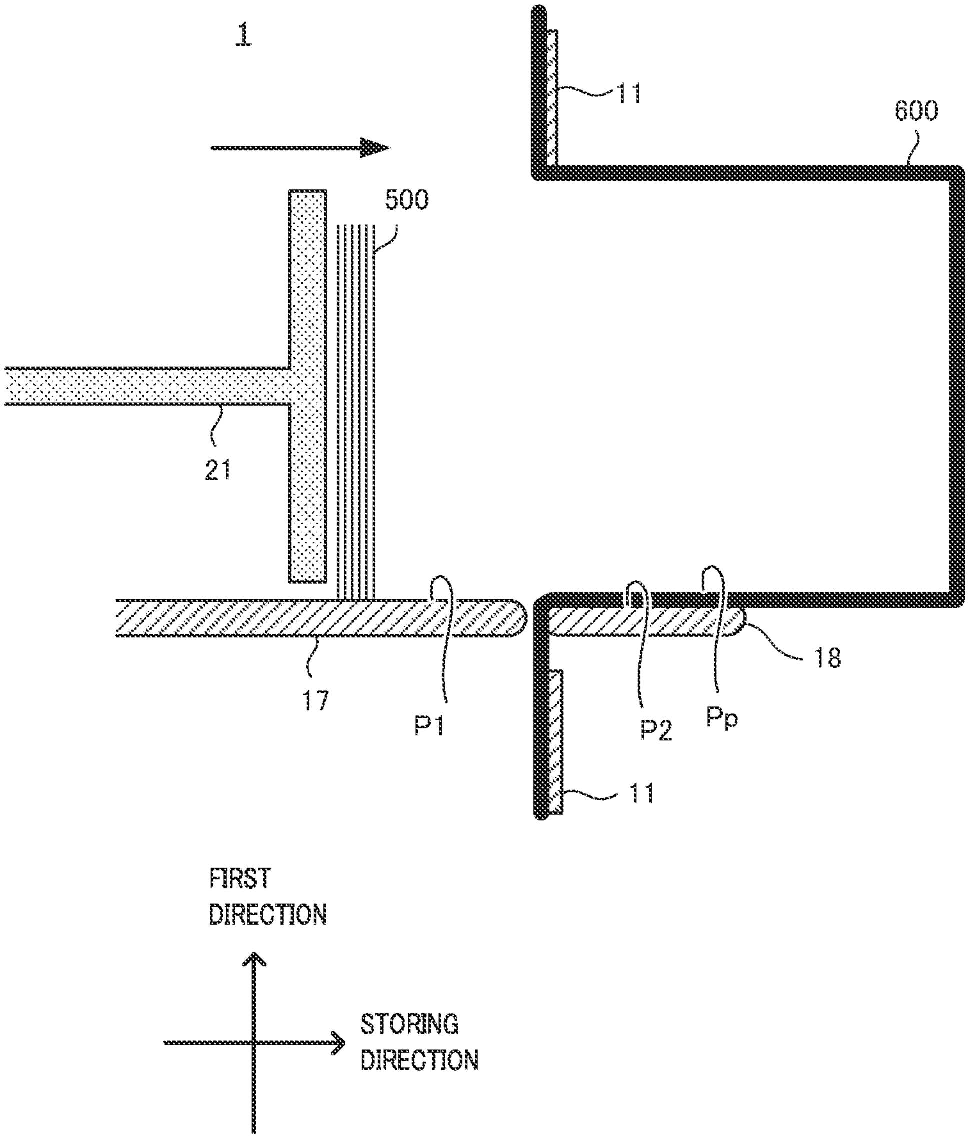
FIG. 1 is a diagram for describing a configuration of a sheet storing device of a first embodiment of the present disclosure.

In the case where there is a step between a support element for temporarily holding banknotes before sent into a bag and the inner surface of the bag in a sheet storing device, the banknotes may be caught by the step when being sent into the bag, and as a result the banknotes may be bent, or may remain at the step.

An object of the present disclosure is to provide a sheet storing device and a sheet processing device that can prevent the sheet from being caught when moving and storing the sheet.

In the sheet storing device of the present disclosure, the end portion of the first guide part and the end portion of the second guide part sandwiching the storage bag may be formed in uneven shapes that engage with each other.

In the sheet storing device of the present disclosure, the end portion of the first guide part and the end portion of the second guide part sandwiching the storage bag may be formed in edgeless uneven shapes.

In the sheet storing device of the present disclosure, the width of the unevenness in the left-right direction formed in the end portion of the first guide part and the end portion of second guide part may be smaller than a length of one end portion of the sheet.

In the sheet storing device of the present disclosure, the end portion of the first guide part may make contact with the inner surface on a depth side than the attaching part in a storing direction in the storage bag to sandwich the storage bag together with the second guide part.

In the sheet storing device of the present disclosure, the attaching part may comprise a first attaching part and a second attaching part, the first attaching part may be disposed on the lower side than the first guide part and the second guide part, and the second attaching part may be disposed on the upper side than the first guide part and the second guide part.

In the sheet storing device of the present disclosure, a sealing part configured to close and seal the opening of the storage bag may be further provided.

In the sheet storing device of the present disclosure, the sealing part may be provided on the depth side than the attaching part in the storing direction at a position sandwiching the storage bag attached to the attaching part from the outside.

In the sheet storing device of the present disclosure, the sealing part may be configured to close the opening by moving in a direction orthogonal to a direction in which the moving part moves the sheet; and the first guide part may be disposed at a position where no interference with a movement of the sealing part occurs.

In the sheet storing device of the present disclosure, the second guide part may move to a position where no interference with a movement of the sealing part along with a movement of the sealing part.

In the sheet storing device of the present disclosure, the sealing part may be disposed at a position overlapping the second guide part in the storing direction before sandwiching the storage bag, and the second guide part may move to the depth side in the storing direction to move out to a position that does not hinder the movement of the sealing part when the sealing part sandwiches the storage bag. In addition, when the second guide part moves to the depth side in the storing direction, it may move upward.

In the sheet storing device of the present disclosure, a temporary retainer that accumulates the sheet before moved to the storage bag may be further provided.

The temporary retainer may comprise a third flat surface that makes contact with the accumulated sheet before moved to the storage bag, and the third flat surface may be disposed on the same plane as the first flat surface.

In the sheet storing device of the present disclosure, the temporary retainer may be in contact with the first guide part; and an end portion of the temporary retainer in contact with the first guide part and an end portion of the first guide part in contact with the temporary retainer may be formed in uneven shapes that engage with each other.

In the sheet storing device of the present disclosure, the width the unevenness in the left-right direction formed in the end portion of the temporary retainer and the end portion of the first guide part that makes contact with the temporary retainer may be smaller than the length of one end portion of the sheet.

In the sheet storing device of the present disclosure, the end portion of the temporary retainer in contact with the first guide part and the end portion of the first guide part in contact with the temporary retainer are formed in edgeless uneven shapes.

In the sheet storing device of the present disclosure, the moving part may be configured to be movable from the near side than the temporary retainer in the storing direction, to the inside of the storage bag, which is the depth side.

The sheet storing device of the present disclosure further comprises a temporary retainer configured to accumulate the sheet before moved to the storage bag; a restriction part configured to restrict a movement of the sheet between the temporary retainer and the storage bag; and a control part configured to control the moving part and the restriction part. The control part moves the moving part in a direction in which the moving part moves the sheet based on in accordance with the number of the sheet accumulated at the temporary retainer in a state where the restriction part restricts the movement of the sheet. The control part moves the moving part into the storage bag in a state where the restriction part does not restrict the movement of the sheet.

In the sheet storing device of the present disclosure, the restriction part in the closed state may restrict the movement of the sheet with the moving part from the temporary retainer to the inside of the storage bag, and the restriction part in the opened state may allow for the movement of the sheet with the moving part from the temporary retainer to the inside of the storage bag.

In the sheet storing device of the present disclosure, the restriction part may be provided as a pair paired in the up-down direction, and the pair of restriction parts may be opened and closed in the up-down direction with control part.

In the sheet storing device of the present disclosure, the second guide part may comprise a groove formed in the second flat surface along a direction in which the moving part may be the sheet; and the moving part may comprise a protrusion that moves along the groove.

In the sheet storing device of the present disclosure, the attaching part may attach the storage bag such that a storing direction is horizontal; and the moving part may move the sheet such that the sheet is stored and arranged in a standing posture in the storage bag.

The sheet storing device of the present disclosure may comprise an attaching part configured to attach a storage bag for a sheet; a moving part configured to move the sheet toward inside of the storage bag; a first guide part configured to make contact with an inner surface of the storage bag; and a second guide part configured to make contact with an outer surface of the storage bag, and sandwich the storage bag together with the first guide part, the first guide part comprises a first flat surface making up a part of a guide surface configured to make contact with the sheet moved by the moving part, the second guide part comprises a second flat surface configured to bring a part of the inner surface of the storage bag into contact with a part of the guide surface by making contact with the outer surface of the storage bag, and the first guide part and the second guide part are disposed such that there is no step at the guide surface.

The sheet processing device of the present disclosure comprises a reception part configured to receive a sheet and the above-mentioned sheet storing device configured to store the sheet.

According to the present disclosure, the sheet can be prevented from being caught when moving and storing the sheet.

The following is a detailed description of each embodiment of the present disclosure with reference to the drawings. However, explanations that are more detailed than necessary, for example, detailed explanations of already well-known matters or duplicated explanations of substantially identical configurations, etc., may be omitted. In addition, the same symbols may be attached to configurations that are common to each embodiment, and duplicate explanations may be omitted.

First Embodiment

FIG. 1 is a diagram for describing a configuration of a sheet storing device of the first embodiment of the present disclosure. As illustrated in FIG. 1, a sheet storing device 1 comprises an attaching part 11, a moving part 21, a first guide part 17, and a second guide part 18.

The attaching part 11 attaches a storage bag 600 for storing a sheet 500. For example, in the present embodiment, the storage bag 600 is attached to the attaching part 11 with the inlet open. The sheet 500 is a banknote, a security or the like. Note that while FIG. 1 illustrates an example where a pair of the attaching parts 11 is provided, the attaching part 11 may not be a pair, and three or more attaching parts may be provided. In addition, the attaching parts may have different shapes.

The moving part 21 move toward the inside of the storage bag 600 attached to the attaching part 11. In this manner, the moving part 21 pushes the sheet 500 to move it.

The first guide part 17 and the second guide part 18 guide the movement of the sheet 500 moved by the moving part 21. One or a plurality of the sheets 500 may be stored in the storage bag 600.

The storage bag 600 is attached to the attaching part 11 such that the inlet faces the moving part 21 side. When the moving part 21 moves toward the inside of the storage bag 600 in this state, the sheet 500 is pushed by the moving part 21 to enter the storage bag 600 together with the moving part 21.

In the following description, the direction from one side to the other of the pair of attaching parts 11 is the first direction. In addition, in the following description, the moving direction of the moving part 21, i.e., the direction in which the sheet 500 is stored in the storage bag 600, is referred to as storing direction. In the following description, as viewed from the inlet side of the storage bag 600, the inner side of the storage bag is referred to as depth side in the storing direction. In addition, the side opposite to the depth side in the storing direction is referred to as near side. The depth side in the storing direction is the right side in FIG. 1. On the other hand, the near side in the storing direction is the left side in FIG. 1. FIG. 1 is a sectional view of the sheet storing device 1 taken along a plane including the first direction and the storing direction orthogonal to the first direction.

The surfaces of the first guide part 17 and the second guide part 18 that guide the sheet 500 are flat surfaces. Note that a flat surface in this specification comprises flat surfaces with a slight curvature, a slight unevenness, a slight inclination and the like, as well as completely flat surfaces. As illustrated in FIG. 1, the surface of the first guide part 17 that guides the sheet 500 is a first flat surface P1, and the surface of the second guide part 18 that guides the sheet 500 is a second flat surface P2. The first guide part 17 and the second guide part 18 are disposed with the first flat surface P1 and the second flat surface P2 located on the same plane. Note that in this specification, the same plane includes substantially the same planes, which includes a case where the first flat surface P1 and the second flat surface P2 are shifted from each other by about the thickness of the storage bag 600, for example.

In addition, the first guide part 17 and the second guide part 18 are disposed so as to sandwich from the inner and outer surfaces the storage bag 600 attached to the attaching part 11 as illustrated in FIG. 1.

With this arrangement, a guide surface for guiding the sheet 500 when pushing the sheet 500 by the moving part 21 and storing it into the storage bag is formed. The guide surface is composed of a part Pp of the inner surface of the storage bag 600 held by the first flat surface P1 of the first guide part 17 and the second flat surface P2 of the second guide part 18. Note that in the following description, the part Pp of the inner surface of the storage bag 600 held by the second flat surface P2 of the second guide part 18 is simply referred to as inner surface Pp. As described above, the first guide part 17 and the second guide part 18 are disposed such that the first flat surface P1 and the second flat surface P2 are located on the same plane, and therefore the first flat surface P1 and the inner surface Pp are also located on the same plane even when taking into account the thickness of the storage bag 600 sandwiched between the first guide part 17 and the second guide part 18. With this configuration, the first guide part 17 and the second guide part 18 are disposed such that there is no step at the guide surface.

When the sheet 500 is stored in the storage bag 600, the moving part 21 moves along the storing direction as described above, and thus it pushes the sheet 500 to the inside of the storage bag 600. At this time, the sheet 500 is moved by the moving part 21, with the front surface or rear surface facing the depth side or near side in the storing direction. In this manner, the sheet 500 is stacked and stored in the storage bag 600.

In the initial stage of the movement of the moving part 21, the sheet 500 is guided by the first flat surface P1 of the first guide part 17. Specifically, in the initial stage of the movement of the moving part 21, one end surface of the sheet 500 moves in contact with the first flat surface P1. As the movement proceeds, the sheet 500 reaches the terminal end of the first flat surface P1 in the storing direction, and makes contact with the inner surface of the storage bag 600 held by the second flat surface P2 of the second guide part 18. The contact portion at this time is the starting end of the inner surface Pp in the storing direction. Thereafter, the sheet 500 moves with one end surface in contact with the inner surface Pp, which is a part of the inner surface of the storage bag 600 held by the second flat surface P2.

As described above, the first flat surface P1 and the inner surface Pp are located on the same plane. In this manner, when the sheet 500 is pushed by the moving part 21 to move from the terminal end of the first flat surface P1 to the starting end of the inner surface Pp in the storing direction, it can be prevented from being caught, fallen or the like between the terminal end of the first flat surface P1 and the starting end of the inner surface Pp.

Second Embodiment

In a sheet processing device of a second embodiment, the end portion of the first guide part 17 making up the terminal end of the first flat surface P1, and the end portion of the second guide part 18 making up the starting end of the inner surface Pp when the storage bag 600 is attached have uneven shapes that engage with each other.

Note that the following description assumes that the storage bag 600 is attached in a lateral manner with respect to the sheet storing device 1. The lateral manner means a state where the inlet of the storage bag 600 faces the direction perpendicular to the up-down direction.

The up-down direction in the following description corresponds to the up-down direction of a case where the sheet storing device 1 is installed on the horizontal plane. The up-down direction of the sheet storing device 1 is a direction orthogonal to the above-described storing direction.

Figure 2:
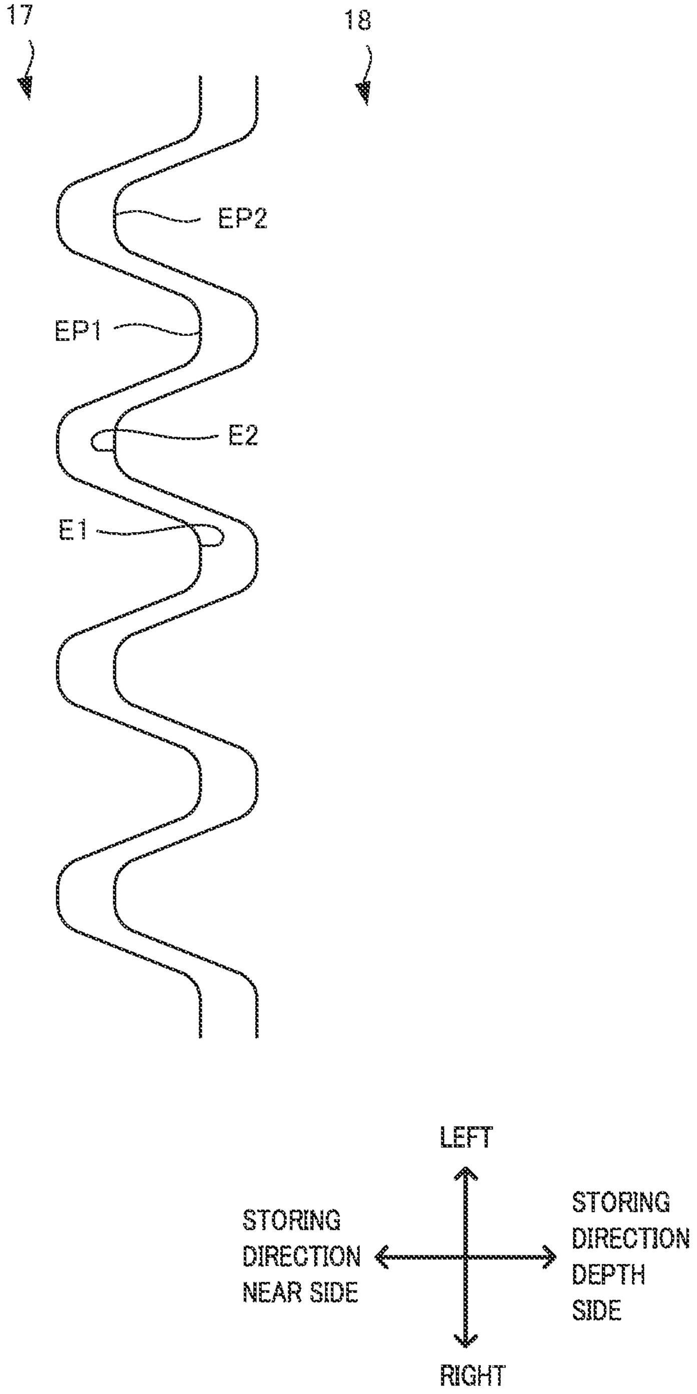
FIG. 2 is a top view illustrating an end portion E1 of a first guide part on the depth side in the storing direction, and an end portion E2 of a second guide part on the near side in the storing direction in a second embodiment.

FIG. 2 is a top view illustrating an end portion E1 of the first guide part 17 on the depth side in the storing direction, and an end portion E2 of the second guide part 18 on the near side in the storing direction in the second embodiment. In the following description, in the sheet storing device 1, the left side of the second guide part 18 as viewed from the first guide part 17 is the left side, and the right side of the second guide part 18 as viewed from the first guide part 17 is the right side.

In FIG. 2, a gap between the first guide part 17 and the second guide part 18 is exaggeratedly illustrated, but practically this gap is about the thickness of the storage bag 600 (see FIG. 1). In this manner, as described in the first embodiment, the first guide part 17 and the second guide part 18 are in contact with each other with the storage bag 600 therebetween.

As illustrated in FIG. 2, a protruding tip end portion EP1 of the end portion E1 of the first guide part 17 is located on the depth side in the storing direction than a protruding tip end portion EP2 of the end portion E2 of the second guide part 18. As such, when the portion where the first guide part 17 and the second guide part 18 are in contact with each other with the storage bag 600 therebetween is viewed from the left or right side, the first guide part 17 and the second guide part 18 overlap each other.

Note that the width of the unevenness of each of the first guide part 17 and the second guide part 18 in the left-right direction is sufficiently smaller than the length of the one end portion of the sheet 500 (see FIG. 1). In this manner, when the sheet 500 moves from the terminal end of the first flat surface P1 to the starting end of the inner surface Pp, it can be prevented from being caught, fallen or the like between the terminal end of the first flat surface P1 and the starting end of the inner surface Pp.

Further, as illustrated in FIG. 2, the unevenness of each of the end portion E1 of the first guide part 17 and the end portion E2 of the second guide part 18 is edgeless unevenness. In this manner, when the sheet 500 in the standing state moves from the terminal end of the first flat surface P1 to the starting end of the inner surface Pp, it can be further effectively prevented from being caught, fallen or the like between the terminal end of the first flat surface P1 and the starting end of the inner surface Pp.

Third Embodiment

In a sheet processing device of a third embodiment, the portion of the first guide part 17 that makes contact with the inner surface of the storage bag 600 attached to the attaching part 11 is located on the depth side in the storing direction than the attaching part 11.

Figure 3:
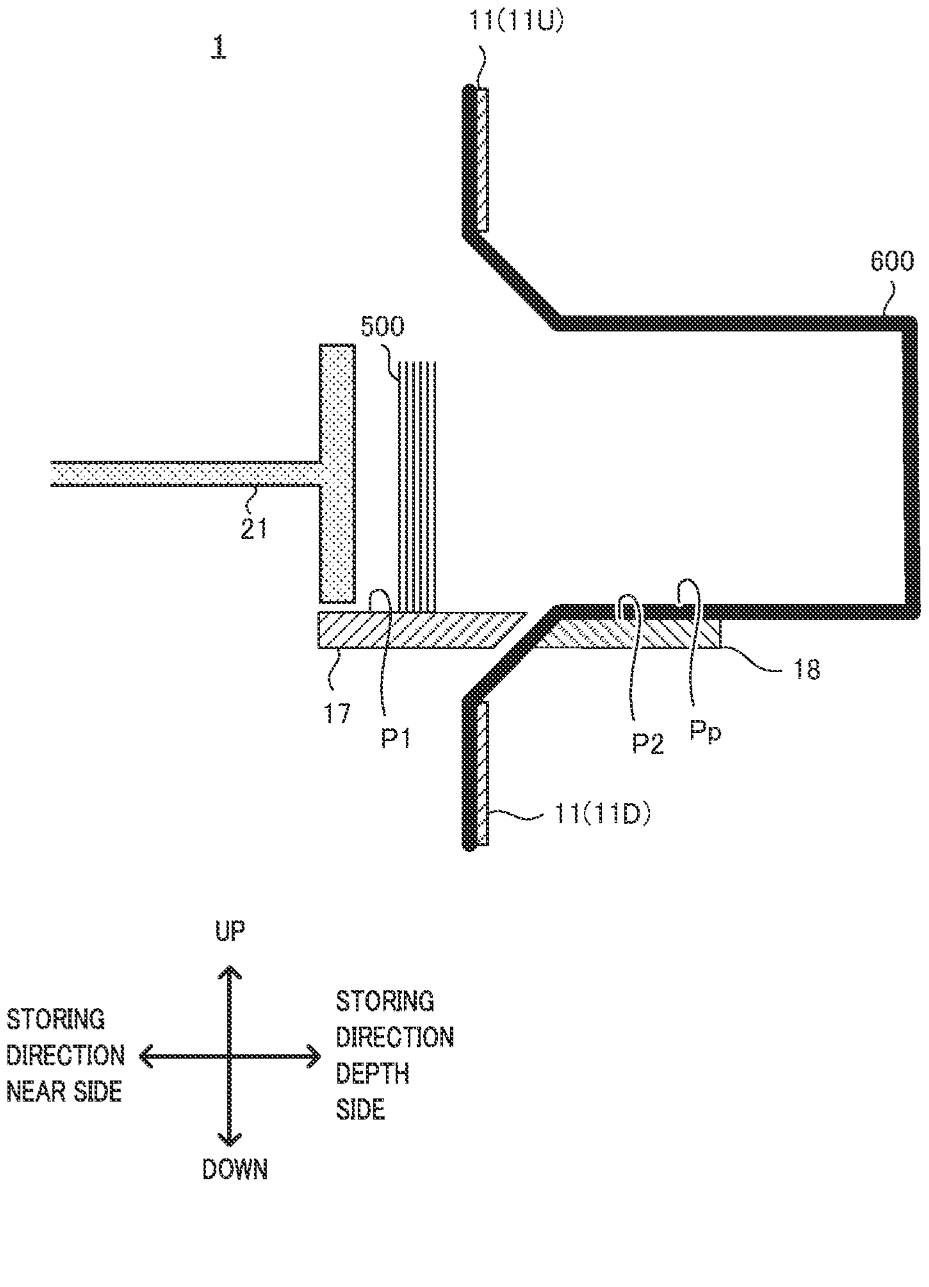
FIG. 3 is a diagram illustrating a positional relationship between an attaching part and a first guide part in a third embodiment.

FIG. 3 is a diagram illustrating a positional relationship between the attaching part 11 and the first guide part 17 in the third embodiment. FIG. 3 illustrates a cross section of the sheet storing device 1 in the plane including the up-down direction and the storing direction. As illustrated in FIG. 3, the first guide part 17 is in contact with the inner surface of the storage bag 600 on the depth side in the storing direction than the attaching part 11. In other words, the end portion of the first guide part 17 on the depth side in the storing direction is protruded to the depth side than the attaching part 11. In the case where the end portion of the first guide part 17 on the depth side is formed in an uneven shape as in the second embodiment, the recessed portion is also protruded to the depth side than the attaching part 11.

The second guide part 18 is disposed on the depth side in the storing direction than the first guide part 17, and therefore the end portion of the second guide part 18 on the near side in the storing direction is also located on the depth side than the attaching part 11 because the end portion of the first guide part 17 on the depth side is protruded to the depth side than the attaching part 11.

On the other hand, as illustrated in FIG. 3, a first attaching part 11D of the pair of attaching parts 11 is disposed on the lower side of the first guide part 17 and the second guide part 18. In addition, a second attaching part 11U is located on the upper side of the first guide part 17 and the second guide part 18.

With this configuration, the storage bag 600 attached to the first attaching part 11D obliquely extends from the upper end portion of the first attaching part 11D to the end portion of the second guide part 18 on the near side in the storing direction, and then extends to the depth side in the storing direction along the second flat surface of the second guide part 18. The end portion of the first guide part 17 on the depth side in the storing direction makes contact with the inner surface of the storage bag 600 by covering the obliquely extending storage bag 600 from the upper side. Note that in FIG. 3, a gap between the end portion of the first guide part 17 on the depth side and the storage bag 600 is illustrated for the sake of convenience of illustration, but practically the end portion of the first guide part 17 on the depth side and the storage bag 600 are in contact with each other as described above.

Further, the end portion of the first guide part 17 on the depth side in the storing direction and the end portion of the second guide part 18 on the near side in the storing direction may be formed in oblique cross-sectional shapes matching the obliquely extending storage bag 600 as illustrated in FIG. 3.

This reduces the ease of formation of a gap between the end portion of the first guide part 17 on the depth side in the storing direction, i.e., the terminal end of the first flat surface P1, and the inner surface of the storage bag 600, i.e., the starting end of the inner surface Pp. In this manner, when the sheet 500 moves from the terminal end of the first flat surface P1 to the starting end of the inner surface Pp, it can be more effectively prevented from being caught, fallen or the like between the terminal end of the first flat surface P1 and the starting end of the inner surface Pp.

Fourth Embodiment

Figure 4:
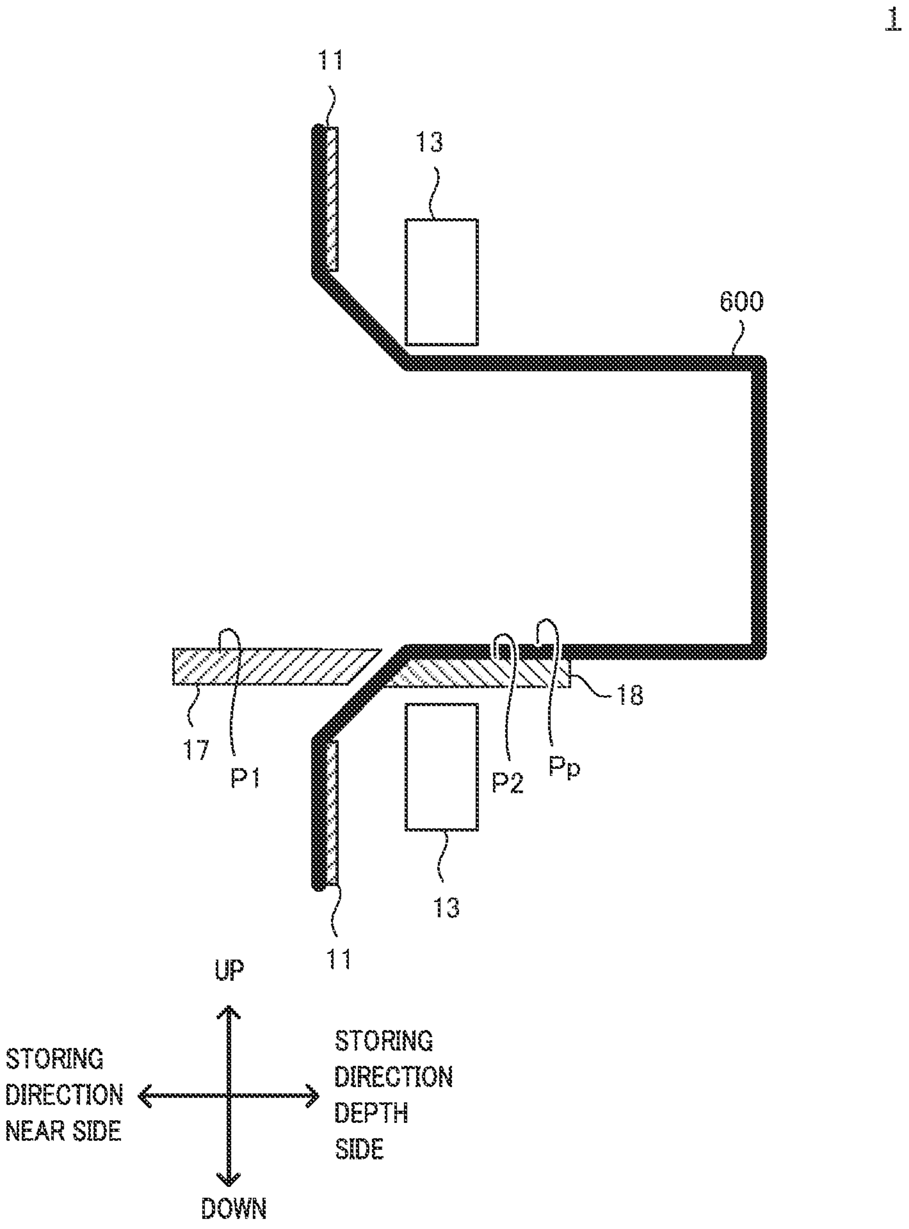
FIG. 4 is a diagram for describing a sheet processing device comprising a sealing part in a fourth embodiment.

In a sheet storing device of a fourth embodiment, a sealing part for closing and sealing the inlet of the storage bag is further provided. FIG. 4 is a diagram for describing the sheet storing device 1 comprising a sealing part 13 in the fourth embodiment. FIG. 4 illustrates a cross section of the sheet storing device 1 in the plane including the up-down direction and the storing direction as in FIG. 3.

In the sheet storing device 1, a pair of the sealing parts 13 is provided on the depth side in the storing direction than the attaching part 11. The pair of sealing parts 13 is disposed at a position that sandwiches, from the outside, the storage bag 600 attached to the attaching part 11.

Figure 5:
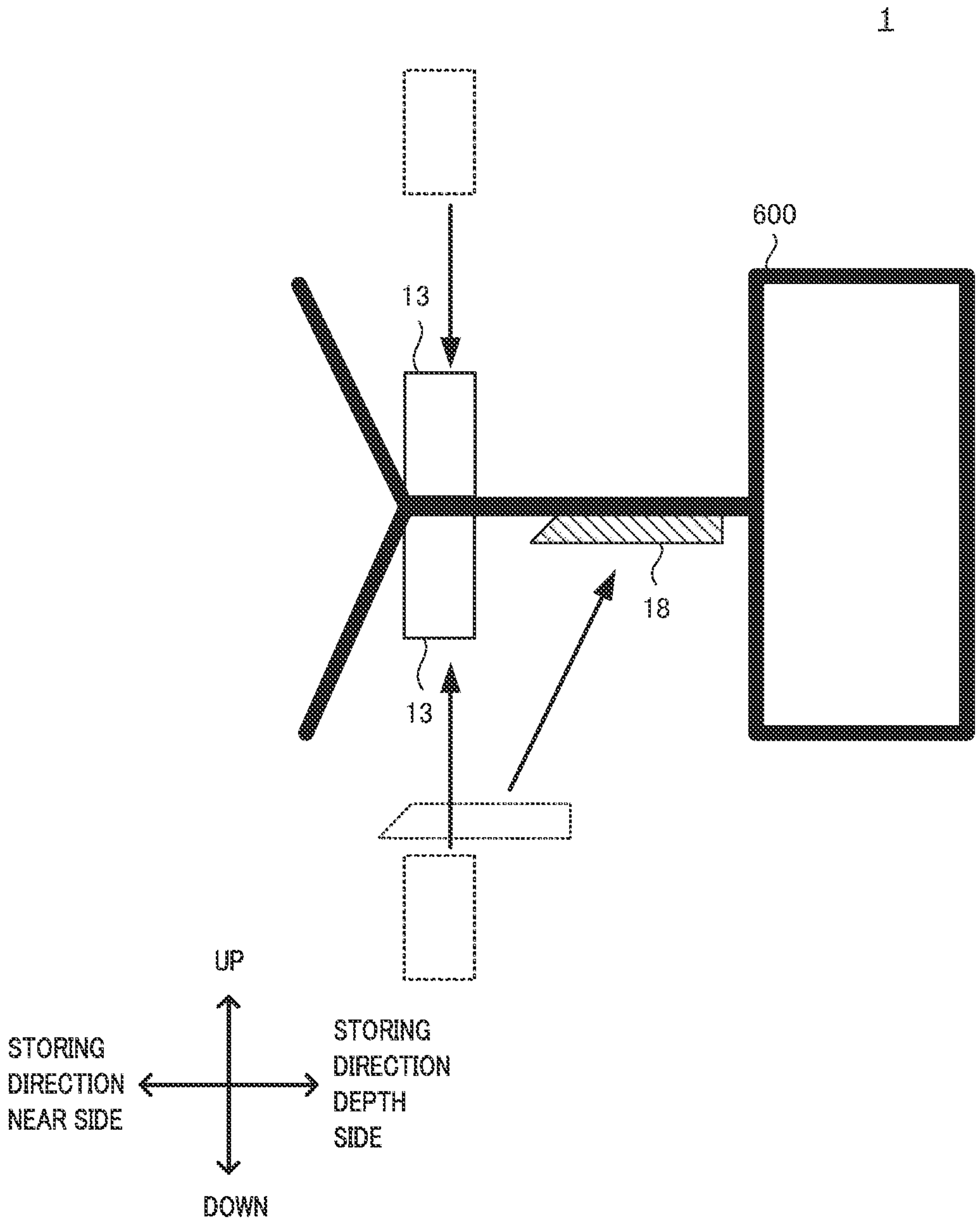
FIG. 5 is a diagram illustrating a state where a storage bag is closed with the sealing part in the fourth embodiment.

The pair of sealing parts 13 moves along the up-down direction orthogonal to the storing direction after the completion of the movement of the sheet by the moving part 21, and closes the inlet of the storage bag 600. When the sealing part 13 closes the inlet of the storage bag 600, the sealing part 13 on the upper side moves downward, and the sealing part 13 on the lower side moves upward. FIG. 5 is a diagram illustrating a state where the storage bag 600 is closed by the sealing part 13. FIG. 5 illustrates a state of the sealing part 13 and the storage bag in the plane including the up-down direction and the storing direction. Note that in the example illustrated in FIGS. 4 and 5, the sealing part 13 moves along the up-down direction such that the positions in the storing direction is not changed before and after the movement, but the positions in the storing direction may be changed before and after the movement. In the example illustrated in FIG. 4, the pair of sealing parts 13 is provided, but the sealing part 13 do not necessarily have to be a pair. For example, a single sealing part disposed on the upper side of the storage bag 600 may move downward to a position that sets the opening of the storage bag 600 to the closed state.

Note that as illustrated in FIG. 4, the sealing part 13 is disposed at a position overlapping the second guide part 18 in the storing direction before sandwiching the storage bag 600. When the sealing part 13 sandwiches the storage bag 600, the second guide part 18 moves to the depth side in the storing direction as illustrated in FIG. 5, to move out to the position where it does not hinder the movement of the sealing part 13. At this time, as illustrated in FIG. 5, the second guide part 18 may move to the depth side in the storing direction, and to the upper side. In this case, the second guide part 18 moves in the direction of closing the storage bag 600, and thus can serve an auxiliary role of closing the storage bag 600.

For example, in the case where at least the inner surface of the inlet portion of the storage bag 600 is formed of resin or the like, the sealing part 13 is a heater, and seals the storage bag 600 by applying heat. In addition, the sealing part 13 may seal the storage bag 600 by bonding the inlet of the storage bag 600 through application of a pressure, or may seal the storage bag 600 by using a device such as a stapler.

Fifth Embodiment

In a fifth embodiment, a configuration on the near side in the storing direction than the first guide part 17 is described.

Figure 6:
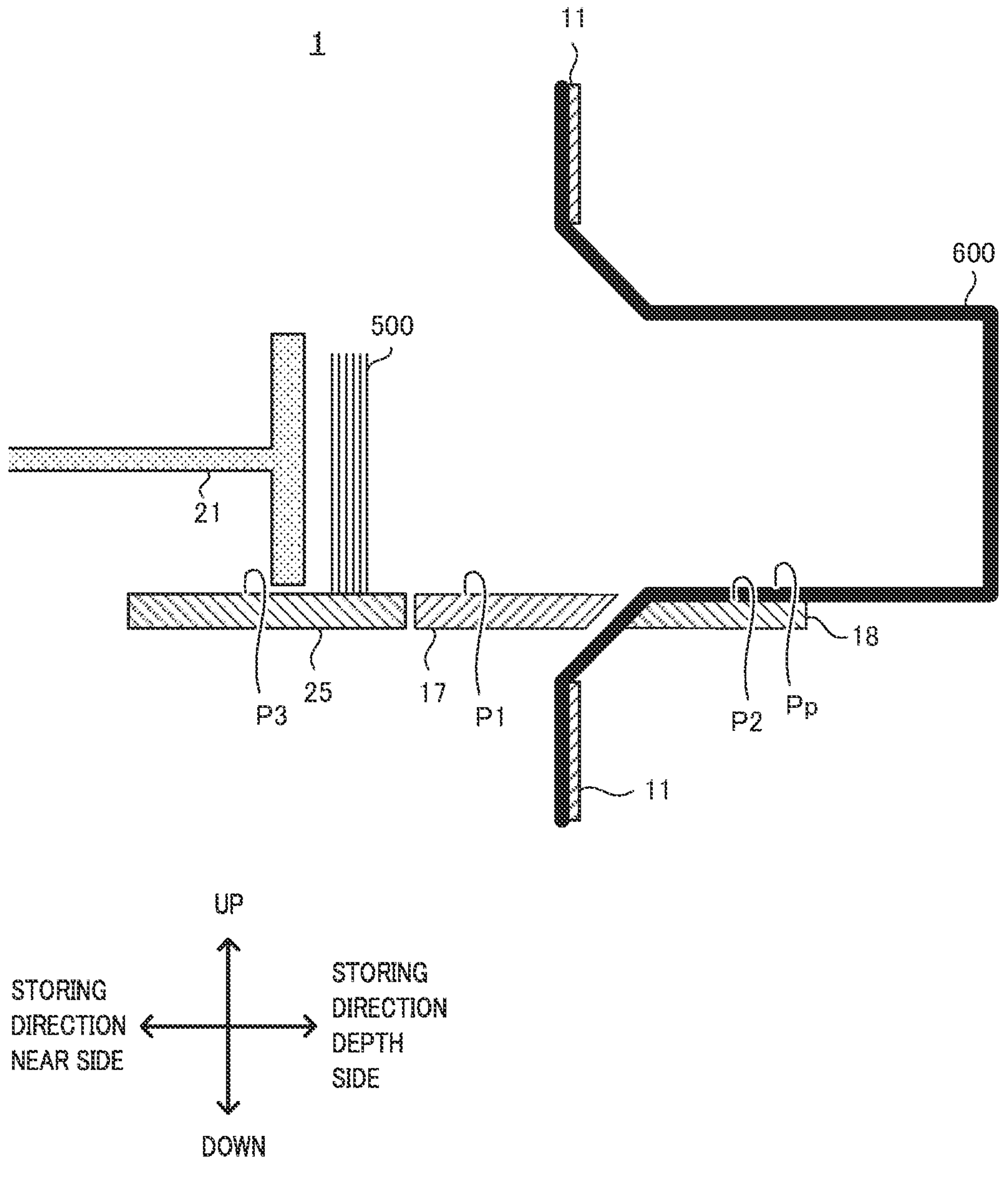
FIG. 6 is a diagram for describing a configuration on the near side in the storing direction than a first guide part in a fifth embodiment.

FIG. 6 is a diagram for describing a configuration on the near side in the storing direction than the first guide part 17 in the fifth embodiment. As illustrated in FIG. 6, a temporary retainer 25 for temporarily retaining the sheet 500 to be stored in the storage bag 600 is provided on the near side in the storing direction than the first guide part 17. The moving part 21 is configured to be movable from the near side in the storing direction than the temporary retainer 25, to the inside of the storage bag 600, which is the depth side.

Note that in the sheet storing device 1, when attaching or detaching the storage bag 600, the temporary retainer 25 and the first guide part 17 may be separated from each other along the storing direction, for example. With a sliding part 30 described in the eighth embodiment described later, the temporary retainer 25 and the first guide part 17 may move in the direction away from each other, for example.

In addition, when attaching or detaching the storage bag 600, the first guide part 17 and the second guide part 18 may separate. At this time, in the state where the first guide part 17 is separated from the second guide part 18, the storage bag 600 is disposed between the first guide part 17 and the second guide part 18, and then the first guide part 17 is returned to the original position, and thus the storage bag 600 is sandwiched by the first guide part 17 and the second guide part 18, for example.

Now description is returned to FIG. 6. The upper surface of the temporary retainer 25 is a third flat surface P3 that is located on the same plane as the first flat surface P1 of the first guide part 17. The accumulated sheets 500 before moved to the storage bag 600 make contact with the third flat surface P3.

With the third flat surface P3 of the temporary retainer 25 located on the same plane as the first flat surface P1, when the sheet 500 retained at the temporary retainer 25 moves from the terminal end of the third flat surface P3 to the starting end of the first flat surface P1, it can be more effectively prevented from being caught, fallen or the like between the terminal end of the third flat surface P3 and the starting end of the first flat surface P1.

Further, the temporary retainer 25 is in contact with the first guide part 17, and the shapes of the terminal end of the third flat surface P3 making up the end portion of the temporary retainer 25 and the starting end of the first flat surface P1 making up the end portion of the first guide part 17 have uneven shapes that engage with each other. In FIG. 6, a gap between the end portion of the temporary retainer 25 and the end portion of the first guide part 17 is illustrated, but practically the end portion of the temporary retainer 25 and the end portion of the first guide part 17 are in contact with each other.

Figure 7:
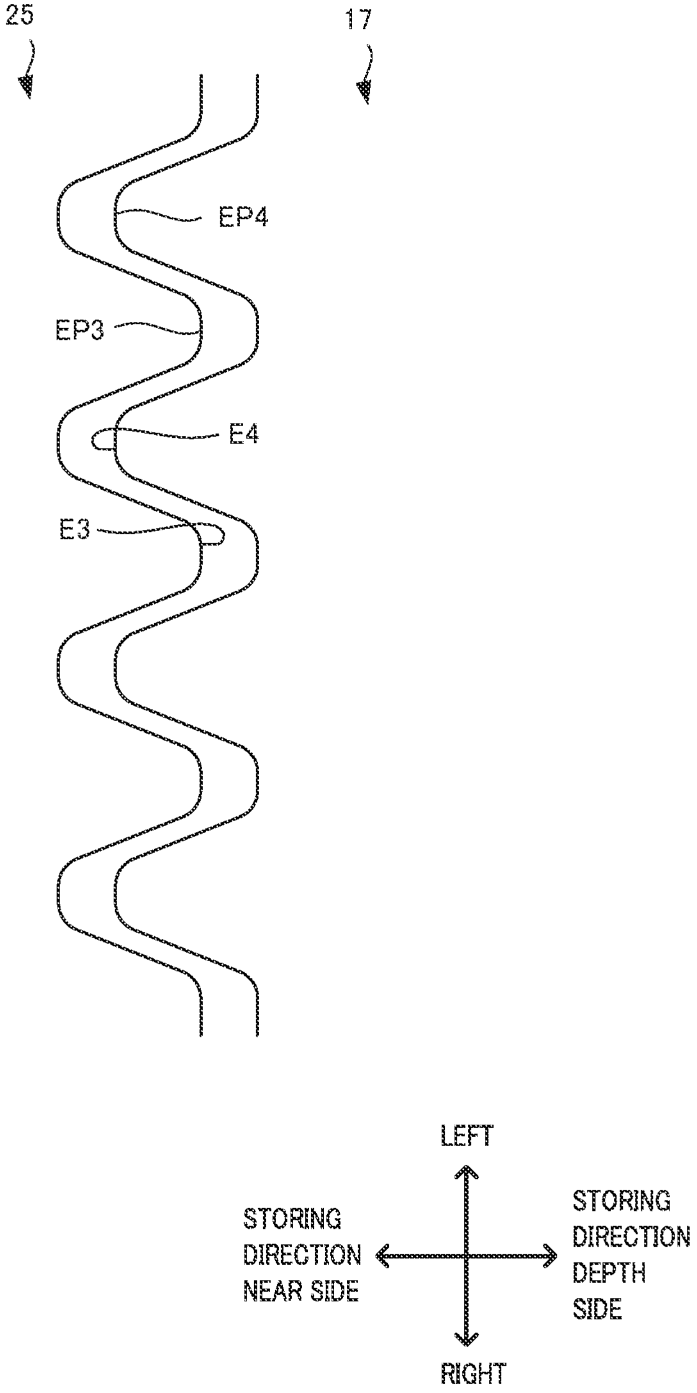
FIG. 7 is a top view illustrating an end portion E3 of a temporary retainer on the depth side in the storing direction, and an end portion E4 of the first guide part on the near side in the storing direction in the fifth embodiment.

FIG. 7 is a top view illustrating an end portion E3 of the temporary retainer 25 on the depth side in the storing direction and an end portion E4 of the first guide part 17 on the near side in the storing direction in the fifth embodiment. Note that in FIGS. 6 and 7, a gap between the end portion of the temporary retainer 25 and the end portion of the first guide part 17 is illustrated, but practically the end portion of the temporary retainer 25 and the end portion of the first guide part 17 are in contact with each other.

In addition, as illustrated in FIG. 7, a protruding tip end portion EP3 of the end portion E3 of the temporary retainer 25 is located on the depth side in the storing direction than a protruding tip end portion EP4 of the end portion E4 of the first guide part 17. Therefore, when the portion where the temporary retainer 25 and the first guide part 17 are in contact with each other with the storage bag 600 therebetween is viewed from the left or right side, the temporary retainer 25 and the first guide part 17 overlap each other.

Note that the width of the unevenness of each of the temporary retainer 25 and the first guide part 17 in the left-right direction is sufficiently smaller than the length of one end portion of the sheet 500 (see FIG. 1). In this manner, when the sheet 500 moves from the terminal end of the third flat surface P3 to the starting end of the first flat surface P1, it can be prevented from being caught, fallen or the like between the terminal end of the third flat surface P3 and the starting end of the first flat surface P1.

Further, as illustrated in FIG. 7, the unevenness of the end portion E3 of the temporary retainer 25 and the end portion E4 of the first guide part 17 is edgeless unevenness. In this manner, when the sheet 500 in the standing state moves from the terminal end of the third flat surface P3 to the starting end of the first flat surface P1, it can be further effectively prevented from being caught, fallen or the like between the terminal end of the third flat surface P3 and the starting end of the first flat surface P1.

Sixth Embodiment

In the sheet storing device 1 according to a sixth embodiment, a restriction part 23 that restricts the movement of the sheet 500 from the temporary retainer 25 to the inside of the storage bag 600 is provided on the depth side in the storing direction than the temporary retainer 25.

Figure 8:
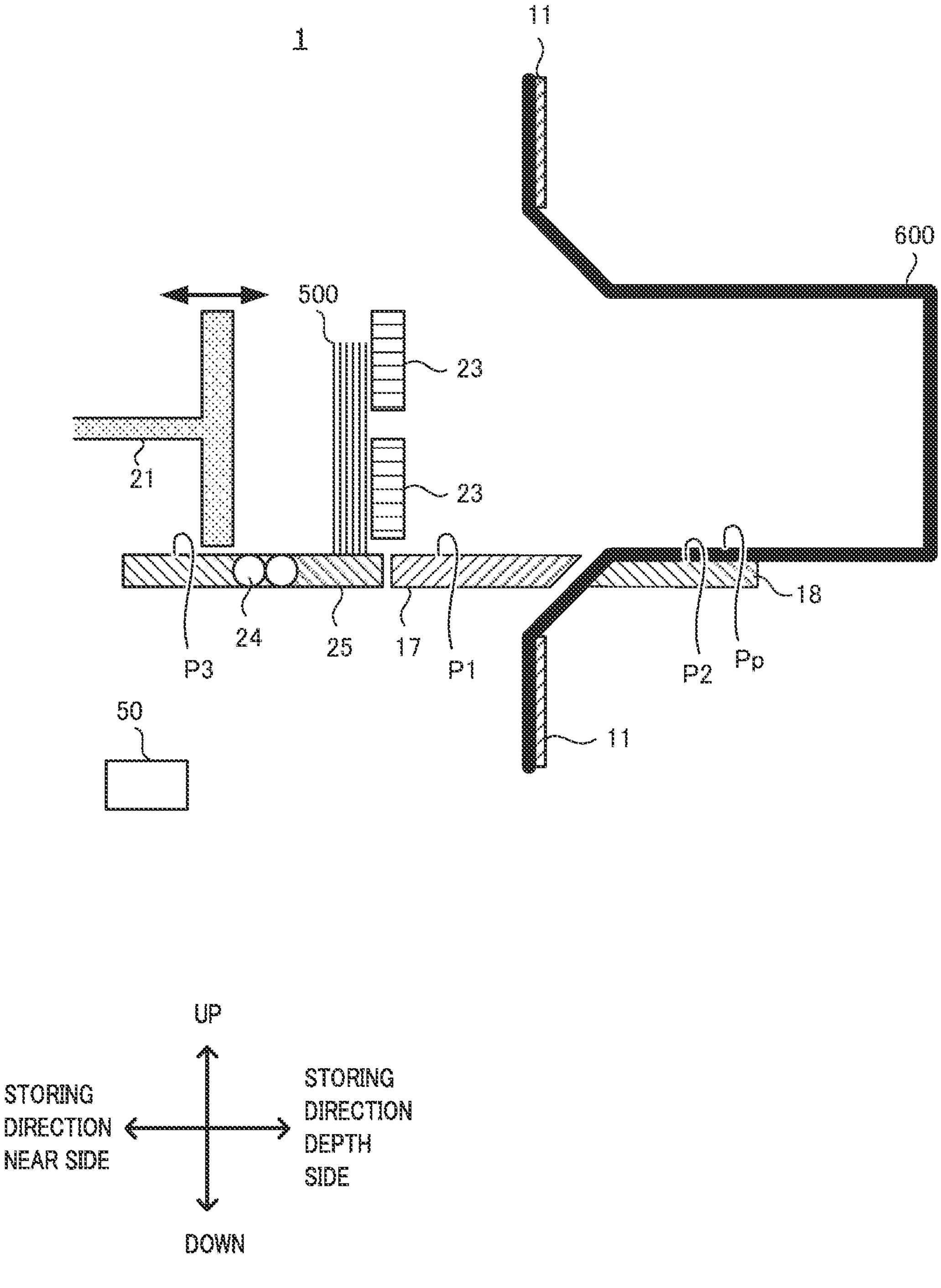
FIG. 8 is a diagram illustrating an example of a configuration of a sheet storing device according to a sixth embodiment.

FIG. 8 is a diagram illustrating an example of a configuration of the sheet storing device 1 according to the sixth embodiment. The restriction parts 23 are paired in the up-down direction, for example. The pair of the restriction parts 23 can be opened and closed in the up-down direction. In the closed state, the restriction part 23 supports the sheet 500 stored in the storage bag 600 between it and a stage 15 described later such that the sheet 500 stored in the storage bag 600 is not fallen over to the near side in the storing direction. In addition, the restriction part 23 in the closed state restricts the movement of the sheet 500 from the temporary retainer 25 to the inside of the storage bag 600, and the restriction part 23 in the opened state allows for the movement of the sheet 500 from the temporary retainer 25 to the inside of the storage bag 600. Note that while the restriction parts 23 are paired in the up-down direction in FIG. 8, the restriction part 23 may not be a pair. A single restriction part, or three or more restriction parts may be provided. In addition, the stage 15 will be elaborated in the eighth embodiment with reference to FIG. 11 and the like.

A feeding part 24 performs accumulation of the sheets 500 at the temporary retainer 25. The feeding part 24 feeds, into a moving unit 20, the sheet 500 transported from the outside of the sheet storing device 1. The feeding part 24 feeds, into the moving unit 20, the sheet 500 with momentum toward the depth side in the storing direction. In this manner, the sheet 500 fed by the feeding part 24 is supported in the standing state by the surface of the closed restriction part 23 on the near side in the storing direction to lean on it. In this manner, the sheets 500 are stacked and temporarily retained at the temporary retainer 25.

In addition, the sheet storing device 1 comprises a control part 50. In the sixth embodiment, the control part 50 controls the moving operation of the sheet 500 with the moving part 21, the restriction operation of the sheet 500 with the restriction part 23, and the feeding operation with the feeding part 24. The control part 50 is, for example, circuitry or processing circuitry which includes a processor such as a CPU (central processing part), general purpose processors, special purpose processors, integrated circuits, ASICs ("Application Specific Integrated Circuits"), conventional circuitry and/or combinations thereof. To be more specific, the control part 50 controls the moving operation of the moving part 21, the restriction operation of the restriction part 23, or the feeding operation of the feeding part 24 by controlling a driving part such as a motor that supplies the driving force for moving the moving part 21, the restriction part 23, and the feeding part 24.

The control part 50 moves the moving part 21 to the depth side in the storing direction on the basis of the number of the sheets 500 accumulated inside the temporary retainer 25 in the state where the restriction part 23 restricts the movement of the sheet 500. The movement amount of the moving part 21 moved by the control part 50 may be determined based on the sum of the thicknesses of the sheets 500 retained inside the temporary retainer 25, for example. At this time, the control part 50 may specify the number of the sheets 500 retained inside the temporary retainer 25 on the basis of the number of sheets fed by the feeding part 24.

In this manner, the unnecessary space between the moving part 21 and the restriction part 23 can be reduced. In this manner, the sheet 500 retained on the temporary retainer 25 can be prevented from being fallen over from the standing state.

Seventh Embodiment

In a seventh embodiment, the moving part 21 is provided with a protrusion extending downward, and the second guide part 18 is provided with a groove for passing through the protrusion.

While the sheet storing device 1 according to the above-described embodiments can reduce the falling over of the sheet 500, but it is difficult to eliminate the fallen sheet 500 when the sheet 500 are fallen over. For example, if the fallen sheet 500 is sandwiched by the inlet portion when sealing the inlet of the storage bag 600 with the sealing part 13, it is difficult to seal the inlet, and therefore a configuration for immediately eliminating the fallen sheet 500 is desired.

Figure 9:
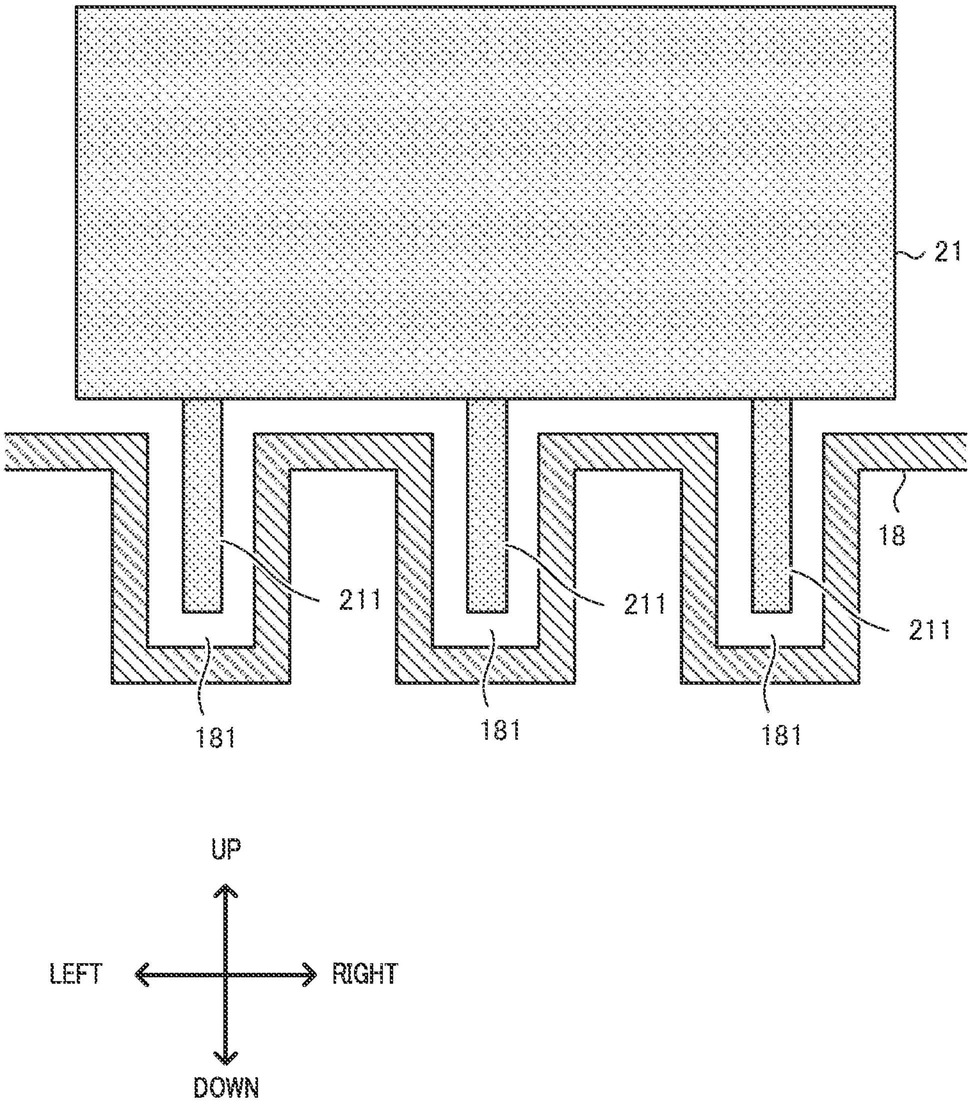
FIG. 9 is a diagram for describing a protrusion extending downward from a moving part, and a groove provided in a second guide part in a seventh embodiment.

FIG. 9 is a diagram for describing a protrusion 211 extending downward from the moving part 21 and a groove 181 provided in the second guide part 18 in the seventh embodiment. FIG. 9 is a sectional view of a second guide part of the sheet storing device 1 taken along a plane including the up-down direction and the left-right direction.

As illustrated in FIG. 9, the tip end of the protrusion 211 is located inside the groove 181. In this manner, the storage bag 600 held by the second guide part 18 is pushed by the protrusion 211 and protruded downward as illustrated in FIG. 9. The width of the groove 181 in the left and right direction is smaller than the width of the sheet 500, and the tip end of the protrusion 211 and the inner surface of the storage bag 600 are in contact with each other at the groove 181, and thus, even if there is a fallen sheet 500, it cannot enter the portion between the protrusion 211 and the storage bag 600. The fallen sheet 500 is pushed by the protrusion 211 to the depth side or near side in the storing direction as the moving part 21 moves. In this manner, it is possible to prevent a situation where the fallen sheet 500 is sandwiched by the inlet of the storage bag 600 when sealing the storage bag 600, making it difficult to seal the inlet.

Eighth Embodiment

In an eighth embodiment, a sheet processing device 100 comprising the sheet storing device 1 of the above-described embodiments is described.

The sheet processing device 100 is an apparatus comprising a processing part that performs each mechanism in the apparatus to perform various processes such as sheet depositing process or dispensing process. In the following description, the side of the sheet processing device 100 on which a reception part 103 described later is disposed is the front side, and the side opposite to the front side is the rear side. In addition, the left-right direction orthogonal to the front-rear direction is the left-right direction.

Figure 10:
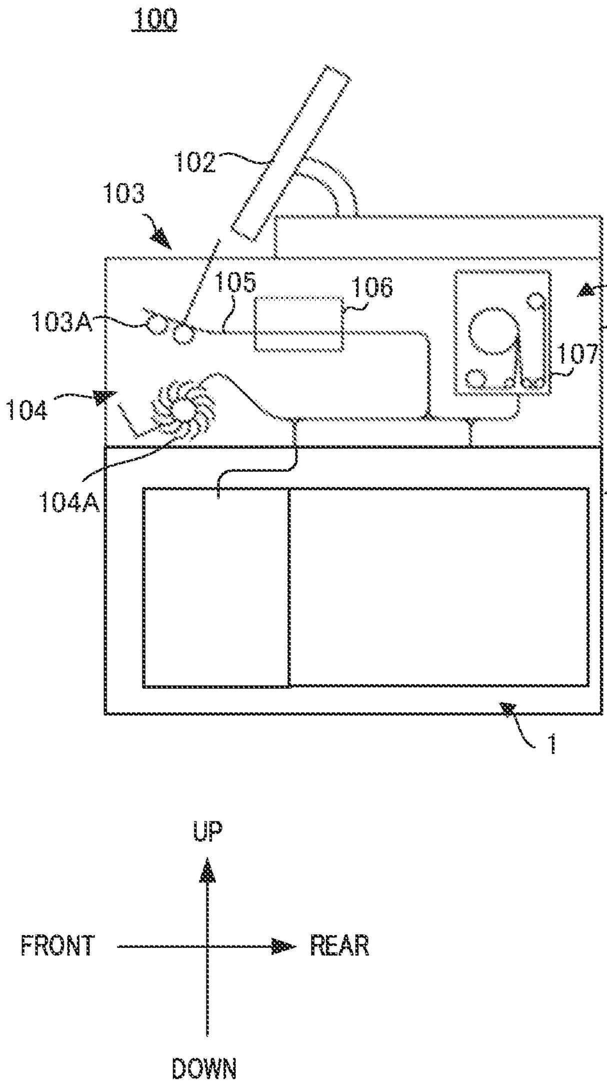
FIG. 10 is a diagram for describing a configuration of a sheet processing device in an eighth embodiment.

As illustrated in FIG. 10, the sheet processing device 100 comprises a housing 101 with a substantially cuboid shape. An upper unit 101A and a lower unit 101B are housed inside the housing 101.

The upper unit 101A is provided with operation part 102, the reception part 103, a dispensing part 104, a transport part 105, a recognition part 106, a storage feeding part 107, and a processing part 108.

An operation part 102 is provided at the upper part of the housing 101. The operation part 102 receives an operation of the user of the sheet processing device 100. The sheet processing device 100 performs various processes in accordance with the user's operation on the operation part 102. The operation part 102 may be a touch panel laid on a display such as a liquid crystal display, for example. In this case, the display displays a screen for the user to select the process to be performed by the sheet processing device 100, a screen indicating the amount (number of sheets or total amount) of the sheets 500 stored in the sheet processing device 100 or the like.

The reception part 103 is provided at an upper part of the front surface of the housing 101. The reception part 103 comprises a reception hopper for inserting banknotes into the housing 101 from the outside, and the like. In addition, the dispensing part 104 for dispensing banknotes from the inside of the housing 101 to the outside is provided on the lower side of the reception part 103.

The reception part 103 receives a sheet group composed of one or more sheets set by the user. The reception part 103 is provided with a feeding mechanism 103A for feeding the sheets of the sheet group one by one into the housing 101. The sheets fed from the feeding mechanism 103A one by one is transported by the transport part 105 one by one.

The recognition part 106 is provided on the transport path making up the transport part 105. The recognition part 106 recognizes the denomination of the sheets transported by the transport part 105. Further, the recognition part 106 may recognize at least authentication, front/rear, fitness, new/old, transport state and the like of the sheets transported by the transport part 105.

In addition, the storage feeding part 107 (temporary retainer) is provided at the succeeding stage of the recognition part 106 in the transport part 105. The storage feeding part 107 temporarily stores sheets transported from the transport part 105, and feeds the stored sheets one by one to the transport part 105. In this manner, the banknotes stored in the storage feeding part 107 can be transported from the storage feeding part 107 to the sheet storing device 1 provided in the lower unit 101B. Note that the storage feeding part 107 is composed of a feeding part of a tape-reel type, for example.

The dispensing part 104 is connected to the transport part 105. In the dispensing process of the sheet processing device 100 and the like, the required number of sheets is temporarily accumulated at the dispensing part 104 by the transport part 105. The dispensing part 104 is accessible from the outside of the housing 101, and the user can take out the sheets accumulated at the dispensing part 104 from the front surface of the housing 101.

A stacking wheel 104A is provided at the connection portion with the dispensing part 104 at the transport part 105. Through the rotation of the stacking wheel 104A, the sheet sandwiched by the vane of the stacking wheel 104A is accumulated at the dispensing part 104.

The processing part 108 with the configurations described above performs various processes such as a depositing process and a dispensing process on sheets received from the reception part 103. The depositing process is a process of storing the received sheets into the storage feeding part 107 or the sheet storing device 1, and the dispensing process is a process of dispensing sheets from the storage feeding part 107 to the dispensing part 104.

Figure 11:
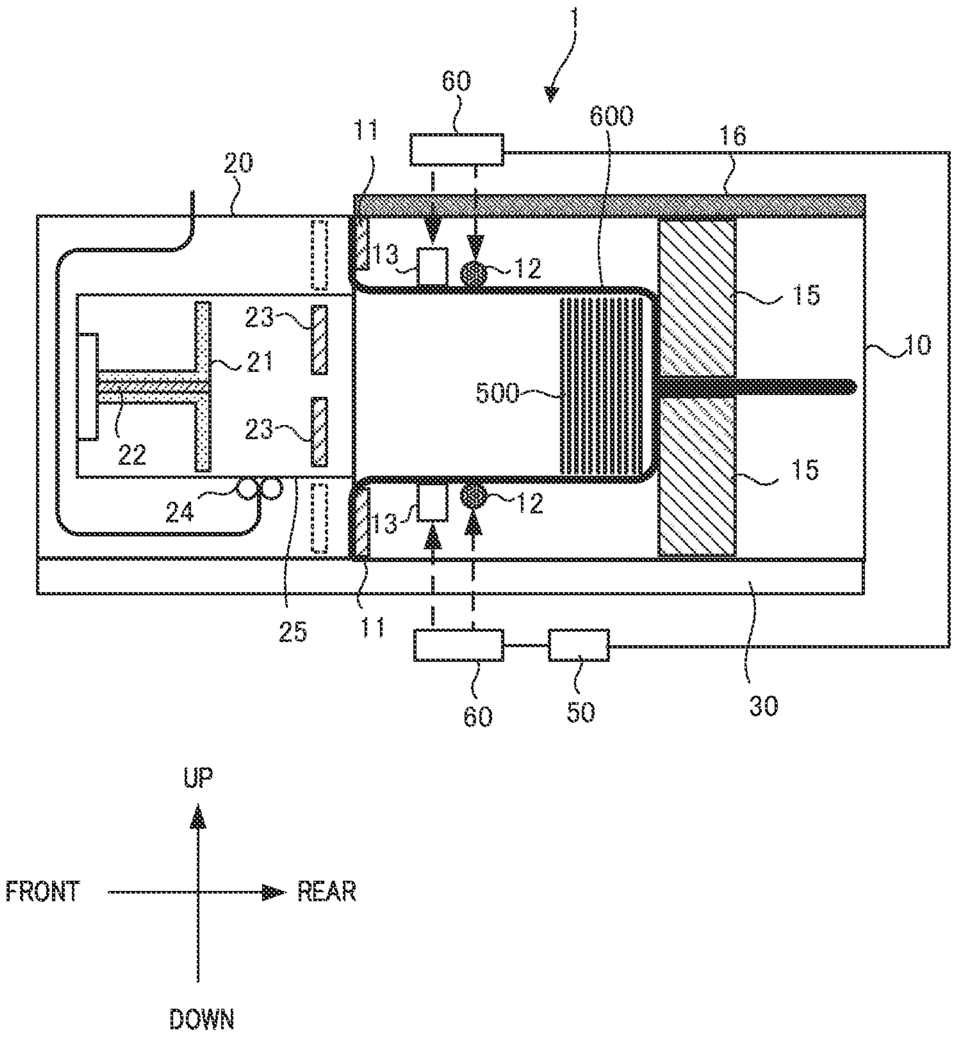
FIG. 11 is a diagram for describing a configuration of a sheet storing device in the eighth embodiment.

The lower unit 101B is provided with the sheet storing device 1. FIG. 11 is a diagram illustrating a general configuration of the sheet storing device 1. In the sheet storing device 1, the storage bag 600 such as a pouch bag is laterally attached, and sheets are stacked and stored in a standing state. The standing state of the sheets is a state where the front and rear surfaces of the sheet face the direction perpendicular to the up-down direction.

As illustrated in FIG. 11, the sheet storing device 1 comprises an attaching unit 10, the moving unit 20, the sliding part 30, and the control part 50. In the example illustrated in FIG. 11, the inlet of the storage bag 600 is attached to face the front side of the sheet processing device 100, but the present disclosure is not limited to this, and the inlet of the storage bag 600 may face the left side, right side or rear side of the sheet processing device 100, or the direction perpendicular to the up-down direction. Specifically, the right side in FIG. 11 is the front side of the sheet storing device 1, and the left side in FIG. 11 is the rear side of the sheet storing device 1. In FIG. 11, the direction from the front side to the rear side of the sheet storing device 1 is the same direction as the storing direction in the above-described embodiments.

The attaching unit 10 is a unit to which the storage bag 600 is attached. The moving unit 20 is a unit that moves the sheet 500 transported by the transport part 105 along the storing direction with the sheet kept in the standing state, and stores the sheet in the storage bag 600.

The attaching unit 10 comprises the attaching part 11, a closing part 12 and the sealing part 13. Further, the attaching unit 10 comprises the stage 15 and a lid 16 as illustrated in FIG. 11. Note that the first guide part 17 and the second guide part 18 in the above-described first to seventh embodiments are configurations provided in the attaching unit 10.

The stage 15 that is movable along the storing direction is provided inside the attaching unit 10. The stage 15 is a portion that regulates the depth from the inlet to the bottom of the laterally attached storage bag 600. The stage 15 is moved by the driving force supplied by a driving part under the control of the control part 50, for example.

A gap is provided near the center of the stage 15 in the left-right direction or the up-down direction. Through this gap, a part of the storage bag 600 can be extended to the depth side in the storing direction. In this manner, the number of the sheets 500 that can be stored in the storage bag 600 can be regulated by moving the stage 15. In FIG. 11, the gap of the stage 15 is provided near the center in the up-down direction.

An opening is provided at the top surface of the attaching unit 10. This opening is provided with the openable and closable lid 16. The lid 16 can be opened and closed through a hinge, and is opened and closed by the hand of the user of the sheet processing device 100, for example. When the sheet storing device 1 is housed in the sheet processing device 100, the lid 16 is in a closed state. As described later, the attaching unit 10 can be pulled out of the housing 101 by means of the sliding part 30, and when the attaching unit 10 is pulled out of the housing 101, the user can easily access the inside of the sheet storing device 1, especially the attaching part 11, by opening the lid 16. In this manner, the user can easily attach the storage bag 600 to the attaching unit 10.

As illustrated in FIG. 11, the moving unit 20 comprises the moving part 21, a holding part 22, the restriction part 23 and the feeding part 24. The moving unit 20 is disposed next to the attaching unit 10 on the near side of the attaching unit 10 in the storing direction, i.e., the side on which the attaching part 11 is disposed. The moving part 21, the holding part 22 and the restriction part 23 move with a driving force supplied by a driving part under the control of the control part 50. For example, a single driving part may supply the driving force to the moving part 21, the holding part 22 and the restriction part 23, or respective driving parts may supply the driving force to them.

The moving part 21 moves the sheets 500 supplied from the outside of the moving unit 20 by pushing the sheets 500 from the inside of the moving unit 20 to the inside of the storage bag 600 attached to the attaching unit 10.

The moving part 21 can move along the storing direction from the near side to the depth side in the storing direction, or from the depth side to the near side in the storing direction. When the moving part 21 moves from the near side to the depth side in the storing direction, the sheet 500 is pushed into the storage bag 600 by the tip end portion of the moving part 21 on the side closer to the attaching unit 10. At this time, the sheet 500, kept in the standing state, is pushed by the moving part 21. Note that in the following description, the tip end portion of the moving part 21 on the side closer to the attaching unit 10 is simply referred to as tip end portion of the moving part 21.

In this manner, the sheet 500 kept in the standing state is stacked and stored in the storage bag 600. When the sheet 500 is pushed to the depth side in the storage bag 600, the moving part 21 is returned to the initial position inside the moving unit 20. The initial position of the moving part 21 is a position on the nearest side in the storing direction in the movable region of the moving part 21, i.e., a position where the moving part 21 is farthest away from the attaching unit 10, for example.

The tip end portion of the moving part 21 is formed in a shape that can efficiently push the sheet 500 in the standing state. The shape of the tip end portion of the moving part 21 is specifically described later. A gap for disposing the holding part 22 is provided near the center of the moving part 21 in the up-down direction.

The holding part 22 is a plate-shaped or rod-shaped portion for holding the sheet 500 pushed by the moving part 21 into the storage bag 600. The holding part 22 is disposed inside the gap provided near the center of the moving part 21 in the up-down direction. Through this gap, the holding part 22 can move along the storing direction. The moving part 21 and the holding part 22 are not fixed to each other, and can move independently of each other along the storing direction.

The restriction part 23 is a member provided near the boundary between the moving unit 20 and the attaching unit 10 to restrict the movement into the storage bag 600 of the sheet 500 inside the moving unit 20. The restriction part 23 supports the banknote stored in the storage bag 600 between it and the stage. In addition, when the sheet 500 is not moved by the moving part 21 to the storage bag 600, the restriction part 23 prevents unintentional entry of the sheet 500 into the storage bag 600 by restricting the movement of the sheet 500. In addition, when the moving part 21 moves the sheet 500 into the storage bag 600, the restriction part 23 releases the restriction.

As illustrated in FIG. 11, the restriction part 23 has a structure divided in the up-down direction. The upper portion of the restriction part 23 is configured to move upward, and the lower portion of the restriction part 23 is configured to move downward. In this manner, the restriction part 23 can be opened and closed. FIG. 11 illustrates the position of the restriction part 23 in the closed state with the solid line, and the position of the restriction part 23 in the opened state with the broken line.

Figure 12:
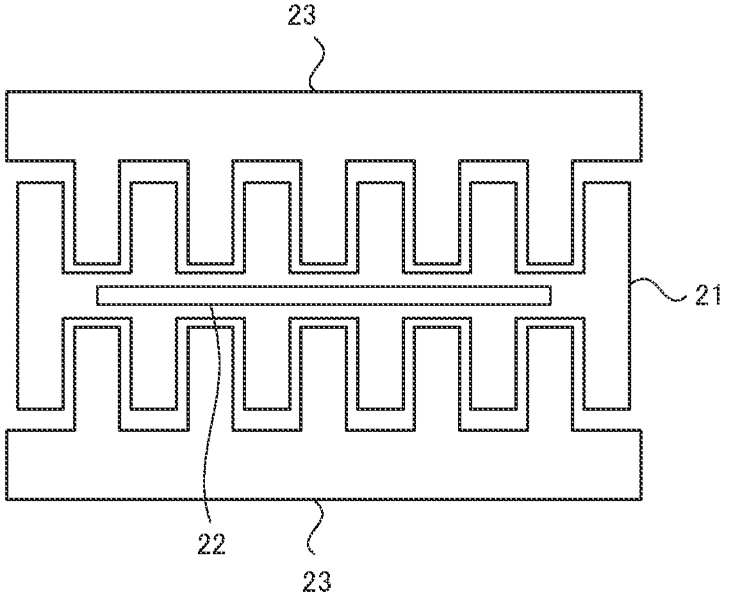
FIG. 12 is a diagram for describing an exemplary operation for storing a sheet in the sheet storing device in the eighth embodiment.

FIG. 12 is a diagram illustrating the moving part 21, the holding part 22, and the restriction part 23 as viewed from the depth side in the storing direction.

As illustrated in FIG. 12, the restriction part 23 is divided in the up-down direction, and each piece is formed in a comb-tooth shape. FIG. 12 illustrates the restriction part 23 in the closed state. With this configuration, the restriction part 23 in the closed state can be set to restrict the movement of the sheet 500 to the depth side in the storing direction. In addition, the restriction part 23 in the opened state can be set to not restrict the movement of the sheet 500 to the depth side in the storing direction.

In addition, as illustrated in FIG. 12, the tip end portion of the moving part 21 on the depth side in the storing direction is formed in a shape that can pass through the gap of the comb-tooth shape of the restriction part 23 in the closed state. In this manner, the tip end portion of the moving part 21 is formed in a shape with a large area in the plane perpendicular to the up-down direction and the storing direction. Thus, the moving part 21 can efficiently push the sheet 500 in the standing state.

The feeding part 24 is a portion that feeds, into the moving unit 20, the sheet 500 transported by the transport part 105. The feeding part 24 performs the feeding operation under the control of the control part 50. The feeding part 24 comprises a rotatable vane to feed the sheet 500 toward the depth side in the storing direction with momentum into the moving unit 20, for example. In this manner, the sheets 500 fed by the feeding part 24 are stacked in the standing state on the near side of the restriction part 23 in the closed state in the storing direction.

The sliding part 30 is a portion for sliding the attaching unit 10 to the outside of the housing 101 of the sheet processing device 100. Openable and closable doors are provided at the front, rear, left and right wall surfaces of the lower unit 101B, and the user can pull the attaching unit 10 to the outside of the housing 101 from the opened door by means of the sliding part 30. In this manner, the user can easily attach or detach the storage bag 600 to or from the attaching unit 10. The sliding part 30 is a slide rail member, for example. In the example illustrated in FIG. 10, the sliding part 30 is provided along the front-rear direction, and the attaching unit 10 can be pulled out from the door provided on the front side or rear side of the housing 101. Note that the sliding part 30 may be configured to slide the moving unit 20 together with the attaching unit 10. In this case, a sliding part for sliding the attaching unit 10 and a sliding part for moving the moving unit 20 may be separately provided.

Exemplary operations of the sheet storing device 1 are described below with reference to FIGS. 13 to 24. FIGS. 13 to 18 are diagrams illustrating each step of an operation of the sheet storing device 1 of storing a predetermined number of sheets into the storage bag 600. In FIGS. 13 to 18, illustration of the closing part 12 and the sealing part 13, which are not described, is omitted.

Figure 13:
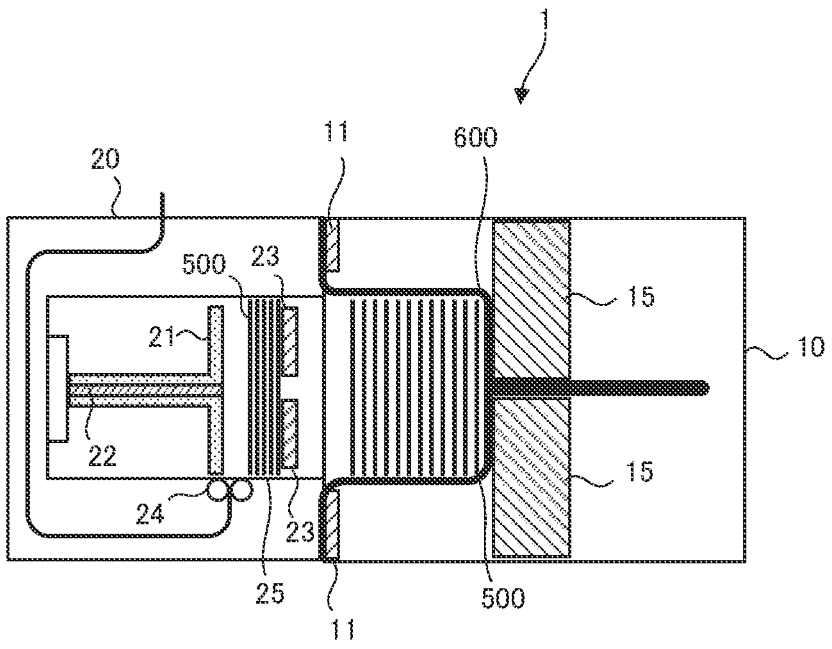
FIG. 13 is a diagram for describing an exemplary operation for storing a sheet in the sheet storing device in the eighth embodiment.

First, as illustrated in FIG. 13, a predetermined number of sheets 500 are fed by the feeding part 24 on the temporary retainer 25 of the moving unit 20, and retained so as to lean on the restriction part 23 (step S1). Note that in the example illustrated in FIG. 13, a certain number of the sheets 500 is stored in advance in the storage bag 600, and the stage 15 of the attaching unit 10 has been moved to a position corresponding to the number of the stored sheets 500.

Figure 14:
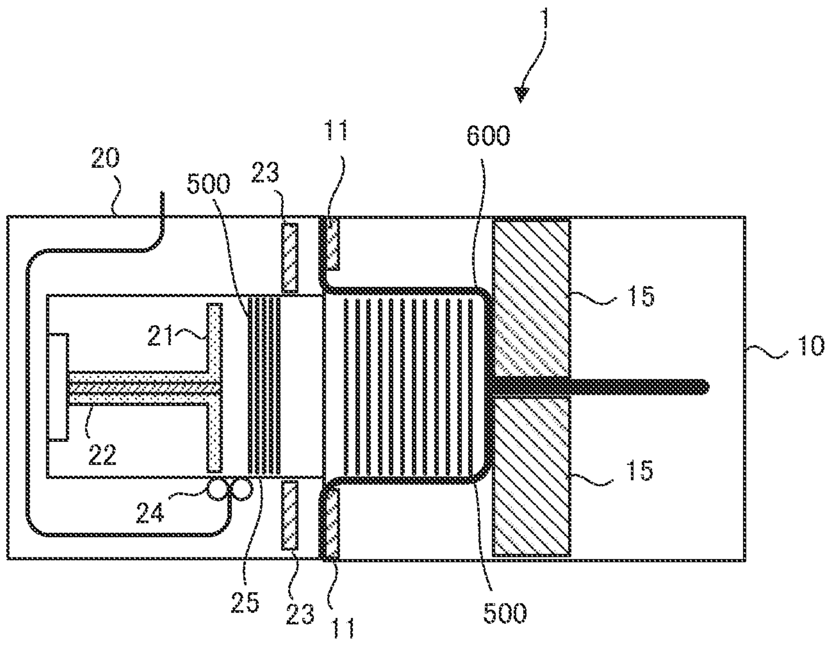
FIG. 14 is a diagram for describing an exemplary operation for storing a sheet in the sheet storing device in the eighth embodiment.

As illustrated in FIG. 14, when a predetermined number of sheets 500 is retained, the restriction part 23 is opened (step S2).

Figure 15:
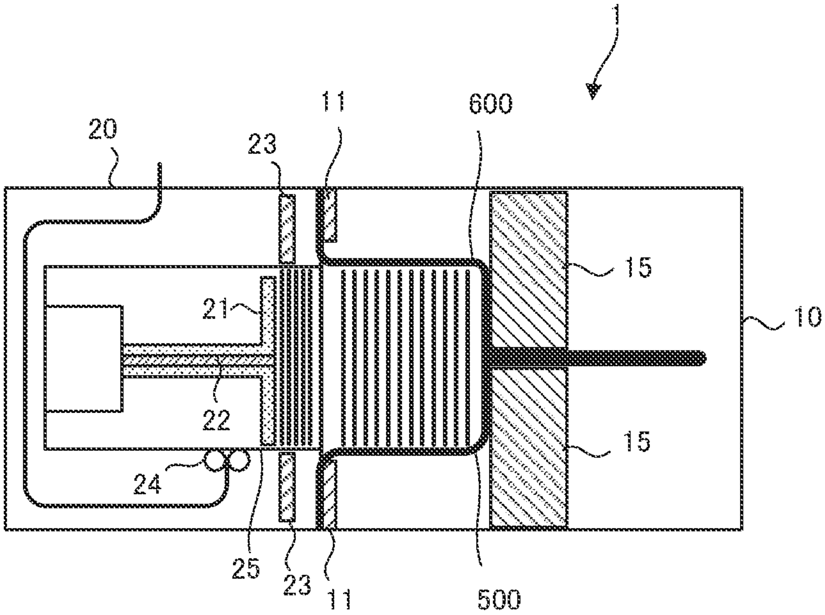
FIG. 15 is a diagram for describing an exemplary operation for storing a sheet in the sheet storing device in the eighth embodiment.

As illustrated in FIG. 15, when the restriction part 23 is opened, the moving part 21 moves the sheet 500 into the storage bag 600 by pushing the sheet 500 toward the depth side in the storing direction (step S3). Note that when the restriction part 23 is opened, the sheet 500 retained to lean on the restriction part 23 is temporarily held by the sheet 500 stored in advance in the storage bag 600, so as not to fallen over. For example, when there is no sheet 500 in the storage bag 600 such as when storing the sheet 500 for the first time into the storage bag 600 attached anew to the attaching unit 10, the sheet 500 can be prevented from being fallen over even when the restriction part 23 is opened by moving the stage 15 to the nearest side in the storing direction.

Figure 16:
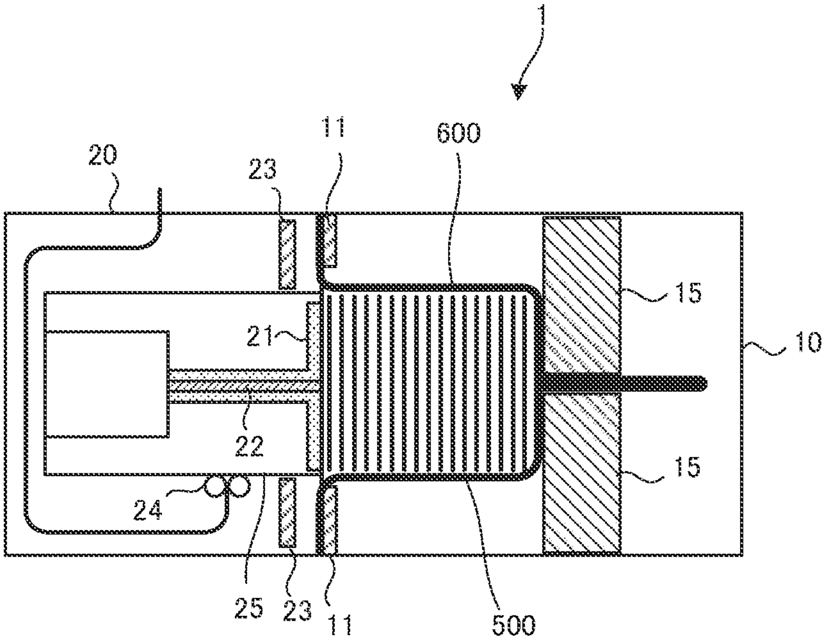
FIG. 16 is a diagram for describing an exemplary operation for storing a sheet in the sheet storing device in the eighth embodiment.

The movement of the moving part 21 to the depth side in the storing direction is continued until the tip end portion of the moving part 21 reaches the predetermined storage position. FIG. 16 illustrates a state where the tip end portion of the moving part 21 has been reached a storage position. Note that when the tip end portion of the moving part 21 cannot reach the storage position due to the thickness of the sheet 500 stored in the storage bag 600, the tip end portion of the moving part 21 is set to the storage position by moving the stage 15 to the depth side in the storing direction as illustrated in FIG. 16 (step S4).

Even after the position of the tip end portion of the moving part 21 in the storing direction is set to a predetermined storage position, the driving force for moving the moving part 21 to the depth side in the storing direction is continuously supplied. In this manner, the sheet 500 is compressed by the moving part 21 in the storage bag 600. Note that the predetermined storage position is a position slightly on the depth side in the storing direction than the restriction part 23, for example.

Figure 17:
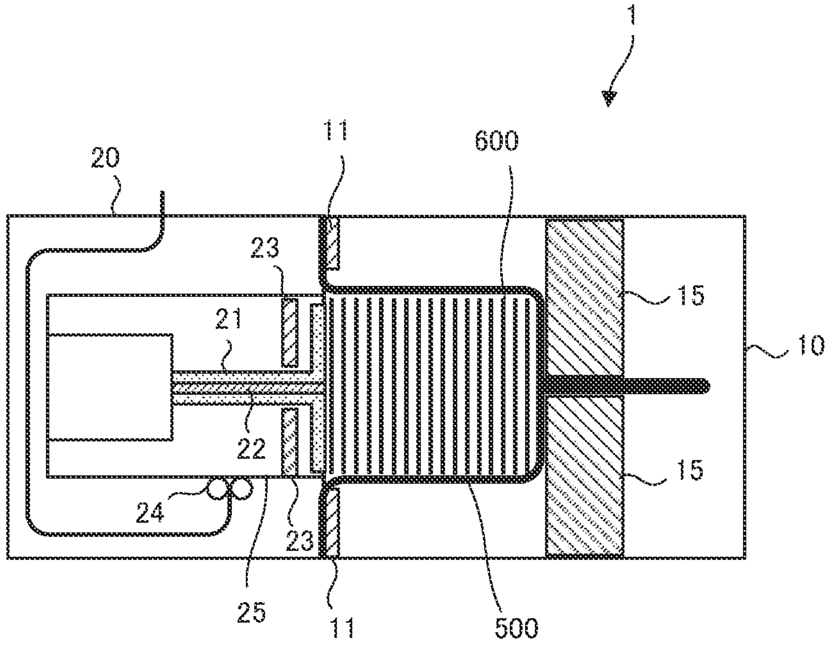
FIG. 17 is a diagram for describing an exemplary operation for storing a sheet in the sheet storing device in the eighth embodiment.

After the position of the tip end portion of the moving part 21 in the storing direction is set to a predetermined storage position, the supply of the driving force to the moving part 21 is stopped, and the position of the moving part 21 in the storing direction is fixed. In this state, the restriction part 23 is closed as illustrated in FIG. 17 (step S5).

Figure 18:
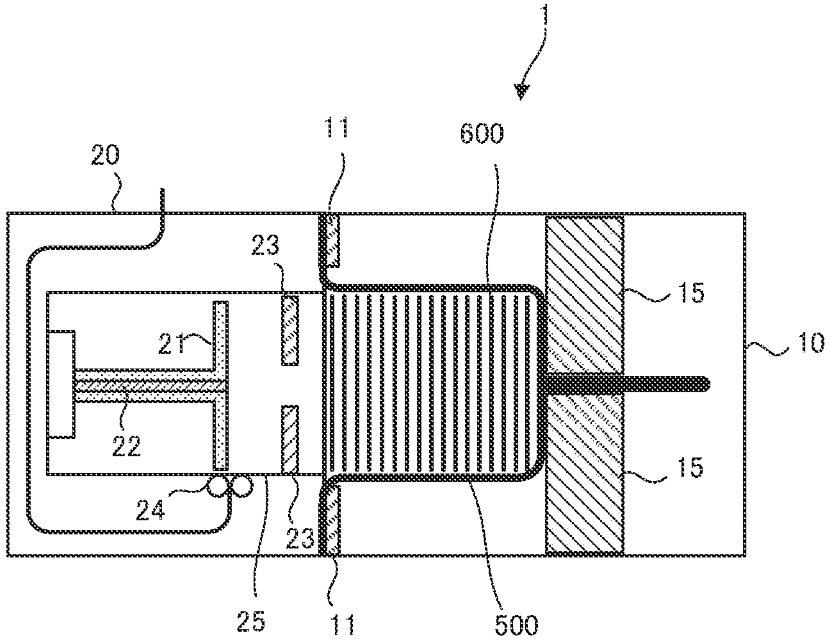
FIG. 18 is a diagram for describing an exemplary operation for sealing a storage bag of the sheet storing device in the eighth embodiment.

As illustrated in FIG. 18, when the restriction part 23 is closed, the entire moving part 21 is returned toward the near side in the storing direction through the gap of the restriction part 23 (step S6). As a result, the sheet 500 with no compression force of the moving part 21 acts to return to the near side in the storing direction in the storage bag 600, but it cannot return to the inside of the moving unit 20 due to the restriction part 23. Thus, the storing of sheets into the storage bag 600 is completed.

Figure 19:
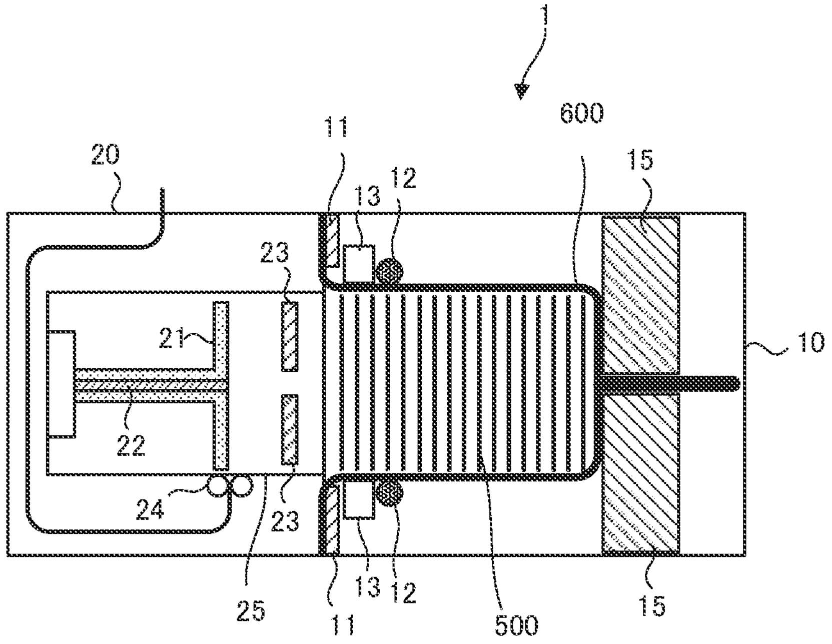
FIG. 19 is a diagram for describing an exemplary operation for sealing the storage bag of the sheet storing device in the eighth embodiment.

FIGS. 19 to 25 are diagrams illustrating each step of an operation of the sheet storing device 1 of sealing the storage bag 600 in the state where a predetermined number of sheets 500 are stored in the storage bag 600. FIG. 19 illustrates a state where a predetermined number of sheets 500 are stored in the storage bag 600 (step S11).

Figure 20:
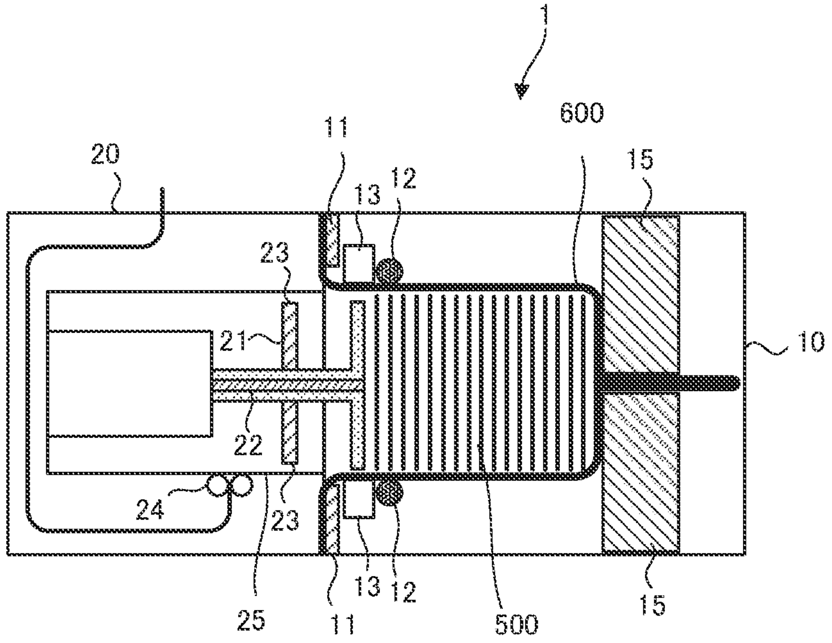
FIG. 20 is a diagram for describing an exemplary operation for sealing the storage bag of the sheet storing device in the eighth embodiment.

First, as illustrated in FIG. 20, the moving part 21 and the holding part 22 move as one piece toward the depth side in the storing direction with the restriction part 23 kept closed (step S12). In this manner, the sheet 500 stored in the storage bag 600 is compressed by the moving part 21 and the stage 15.

Figure 21:
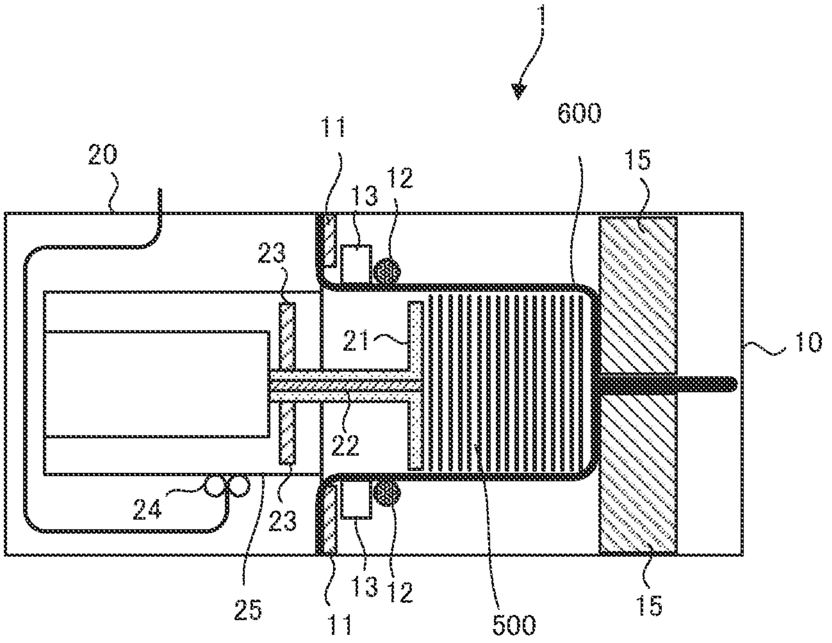
FIG. 21 is a diagram for describing an exemplary operation for sealing the storage bag of the sheet storing device in the eighth embodiment.

The movement of the moving part 21 and the holding part 22 to the depth side in the storing direction is continued until the tip end portion of the moving part 21 reaches a predetermined sealing position. Note that in the case where the tip end portion of the moving part 21 cannot reach the sealing position due to the thickness of the sheet 500 stored in the storage bag 600, the tip end portion of the moving part 21 can be set to the sealing position by moving the stage 15 to the depth side in the storing direction (step S13). FIG. 21 is a diagram illustrating a state where the tip end portion of the moving part 21 has reached the sealing position. Note that the predetermined sealing position is a position on the depth side in the storing direction than the sealing part 13 and the closing part 12.

Figure 22:
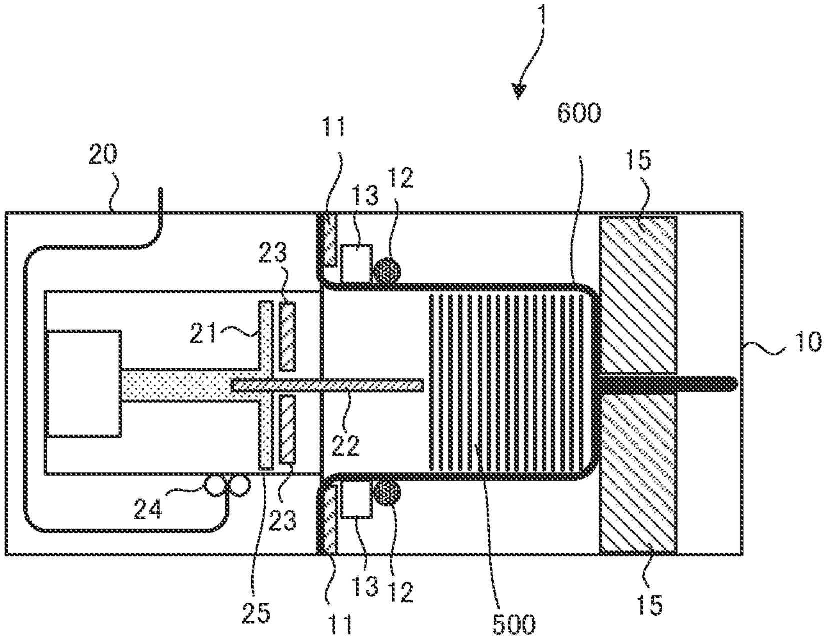
FIG. 22 is a diagram for describing an exemplary operation for sealing the storage bag of the sheet storing device in the eighth embodiment.

When the tip end portion of the moving part 21 has reached the sealing position, the tip end portion of the holding part 22 is fixed to the sealing position as illustrated in FIG. 22, and the entire moving part 21 is returned to the inside of the moving unit 20 (step S14). In this manner, the sheet 500 is held by the holding part 22. At step S14, the moving part 21 may return to the initial position of the moving part 21, or stop as necessary at a position on the depth side in the storing direction in the moving unit 20.

Figure 23:
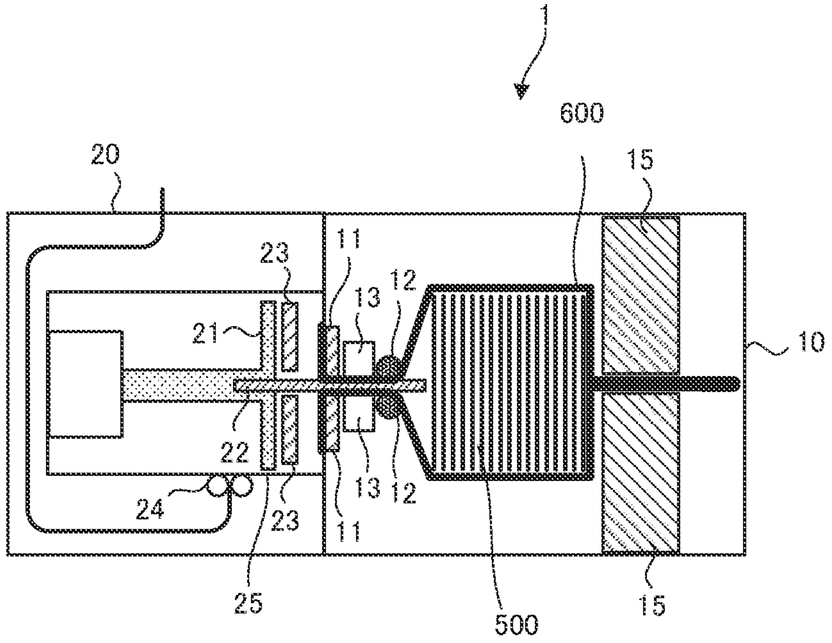
FIG. 23 is a diagram for describing an exemplary operation for sealing the storage bag of the sheet storing device in the eighth embodiment.
Figure 24:
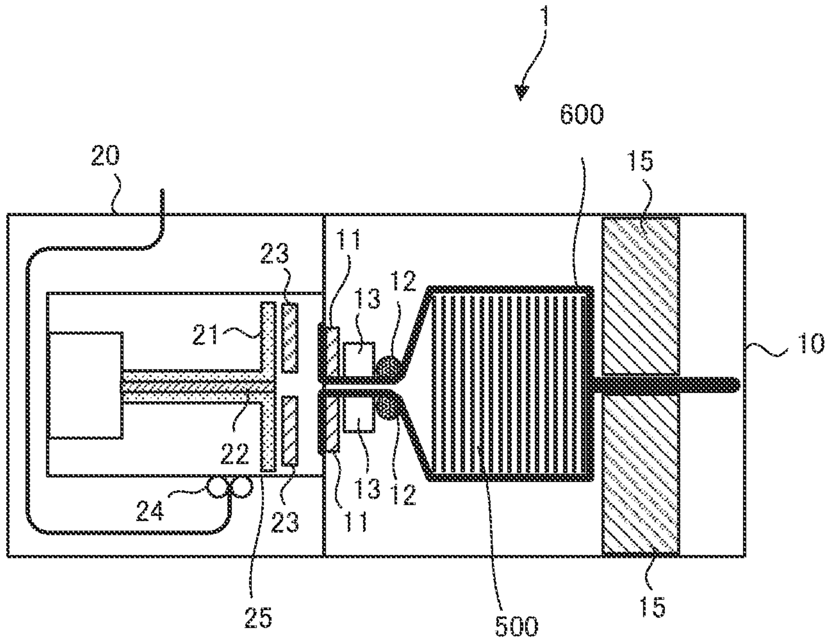
FIG. 24 is a diagram for describing an exemplary operation for sealing the storage bag of the sheet storing device in the eighth embodiment.

As illustrated in FIG. 23, the closing part 12 closes the storage bag 600 in the state where the holding part 22 holds the sheet 500 (step S15). As illustrated in FIG. 24, in the state where it is closed to a certain degree, the entire holding part 22 is returned to the inside of the moving unit 20 (step S16). Since the holding part 22 is returned with the storage bag 600 closed to a certain degree, the sheet 500 is held by the inner surface of the storage bag 600 instead of the holding part 22. In this manner, the sheet 500 is not fallen over. The moving part 21 and the holding part 22 are returned to the initial position, i.e., the position on the nearest side in the storing direction in the movable region of the moving part 21 and the holding part 22.

Figure 25:
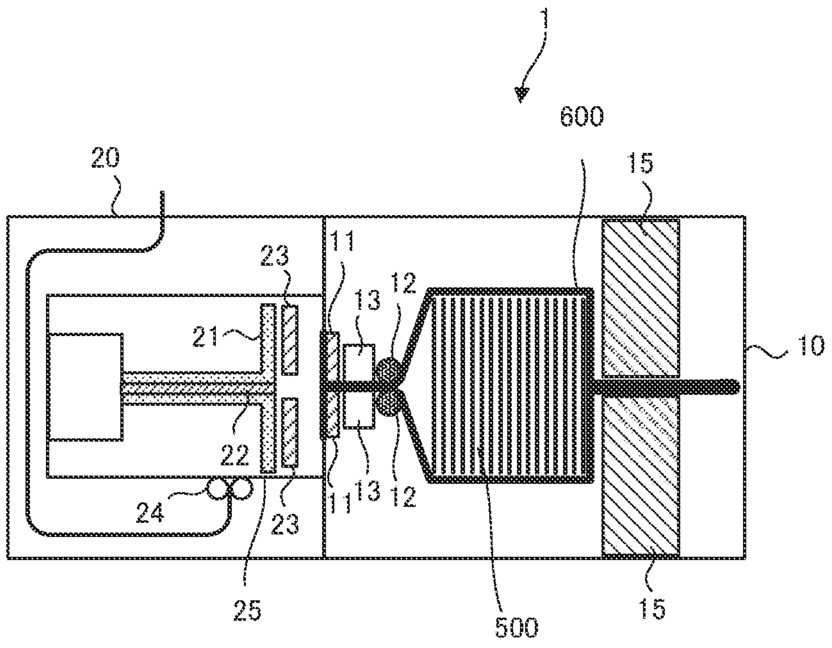
FIG. 25 is a diagram for describing an exemplary operation for sealing the storage bag of the sheet storing device in the eighth embodiment.

Next, as illustrated in FIG. 25, the closing part 12 completely closes the storage bag 600, and the sealing part 13 seals the inlet of the storage bag 600 (step S17). In this manner, the sealing of the storage bag 600 is completed.

Upon completion of the sealing of the storage bag 600, the user pulls the attaching unit 10 to the outside of the housing 101 by means of the sliding part 30 illustrated in FIG. 12. In this manner, the user can detach from the attaching unit 10 the sealed storage bag 600 in which the sheet 500 is stored, and can attach a new storage bag 600 to the attaching unit 10.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

What is claimed is:

1. A sheet storing device comprising:

an attaching part configured to attach a storage bag for a sheet;

a moving part configured to move the sheet toward inside of the storage bag;

a first guide part configured to make contact with an inner surface of the storage bag; and a second guide part configured to make contact with an outer surface of the storage bag, and sandwich the storage bag together with the first guide part, wherein the first guide part comprises a first flat surface configured to make contact with the sheet moved by the moving part, the second guide part comprises a second flat surface configured to make contact with the outer surface of the storage bag such that the sheet moved by the moving part makes contact with a part of the inner surface of the storage bag, and the first guide part and the second guide part are disposed such that the first flat surface and the second flat surface are located on the same plane.

2. The sheet storing device according to claim 1, wherein an end portion of the first guide part and an end portion of the second guide part sandwiching the storage bag are formed in uneven shapes that engage with each other.

3. The sheet storing device according to claim 2, wherein the end portion of the first guide part and the end portion of the second guide part sandwiching the storage bag are formed in edgeless uneven shapes.

4. The sheet storing device according to claim 1, wherein an end portion of the first guide part makes contact with the inner surface on a depth side than the attaching part in a storing direction at the storage bag to sandwich the storage bag together with the second guide part.

5. The sheet storing device according to claim 1, further comprising a sealing part configured to close and seal an opening of the storage bag.

6. The sheet storing device according to claim 5, wherein the sealing part is configured to close the opening by moving in a direction orthogonal to a direction in which the moving part moves the sheet; and the first guide part is disposed at a position where no interference with a movement of the sealing part occurs.

7. The sheet storing device according to claim 5, wherein the second guide part moves to a position where no interference with a movement of the sealing part occurs, along with the movement of the sealing part.

8. The sheet storing device according to claim 1, further comprising a temporary retainer comprising a third flat surface configured to make contact with the sheet accumulated before moved to the storage bag, wherein the temporary retainer is disposed such that the third flat surface is located on the same plane as the first flat surface.

9. The sheet storing device according to claim 8, wherein the temporary retainer is in contact with the first guide part; and wherein an end portion of the temporary retainer in contact with the first guide part and an end portion of the first guide part in contact with the temporary retainer are formed in uneven shapes that engage with each other.

10. The sheet storing device according to claim 9, wherein the end portion of the temporary retainer in contact with the first guide part and the end portion of the first guide part in contact with the temporary retainer are formed in edgeless uneven shapes.

11. The sheet storing device according to claim 1, further comprising:

a temporary retainer configured to accumulate the sheet before moved to the storage bag;

a restriction part configured to restrict a movement of the sheet between the temporary retainer and the storage bag; and circuitry configured to control the moving part and the restriction part, wherein the circuitry configured to cause to move the moving part in a direction in which the moving part moves the sheet based on a number of the sheets accumulated at the temporary retainer in a state where the restriction part restricts the movement of the sheet, and move the moving part into the storage bag in a state where the restriction part does not restrict the movement of the sheet.

12. The sheet storing device according to claim 1, wherein the second guide part comprises a groove formed in the second flat surface along a direction in which the moving part moves the sheet; and the moving part comprises a protrusion configured to move along the groove.

13. The sheet storing device according to claim 1, wherein the attaching part attaches the storage bag such that a storing direction is horizontal; and the moving part moves the sheet such that the sheet is stored and arranged in a standing state in the storage bag.

14. A sheet storing device comprising:

an attaching part configured to attach a storage bag for a sheet;

a moving part configured to move the sheet toward inside of the storage bag;

a first guide part configured to make contact with an inner surface of the storage bag; and a second guide part configured to make contact with an outer surface of the storage bag, and sandwich the storage bag together with the first guide part, wherein the first guide part comprises a first flat surface making up a part of a guide surface configured to make contact with the sheet moved by the moving part, the second guide part comprises a second flat surface configured to bring a part of the inner surface of the storage bag into contact with a part of the guide surface by making contact with the outer surface of the storage bag, and the first guide part and the second guide part are disposed such that there is no step at the guide surface.

15. A sheet processing device comprising:

a reception part configured to receive a sheet; and the sheet storing device according to claim 1 configured to store the sheet.

* * * * *